(12) United States Patent
Levit et al.

(10) Patent No.: US 11,347,379 B1
(45) Date of Patent: May 31, 2022

(54) CAPTIONS FOR AUDIO CONTENT

(71) Applicant: Audible, Inc., Newark, NJ (US)

(72) Inventors: Svetlana Levit, South Orange, NJ (US); Shailesh Vyas, Edison, NJ (US); Robert Lyons, Holmdel, NJ (US); Igor Belakovskiy, Cambridge, MA (US); Jordan Apgar, Columbia, NJ (US); Chandana Kanchanagari, Piscataway, NJ (US); Richard Stern, Chatham, NJ (US); Ryan Gadsby, Hopkinton, MA (US); Sanjay Tiwary, Allendale, NJ (US)

(73) Assignee: Audible, Inc., Newark, NJ (US)

( * ) Notice: Subject to any disclaimer, the term of this patent is extended or adjusted under 35 U.S.C. 154(b) by 88 days.

(21) Appl. No.: 16/390,817

(22) Filed: Apr. 22, 2019

(51) Int. Cl.
*G06F 3/0483* (2013.01)
*G06F 3/0484* (2022.01)
*G06F 3/16* (2006.01)
*H04N 21/488* (2011.01)

(52) U.S. Cl.
CPC .......... *G06F 3/0483* (2013.01); *G06F 3/0484* (2013.01); *G06F 3/167* (2013.01); *H04N 21/4884* (2013.01)

(58) Field of Classification Search
CPC ...... G06F 3/0481; G06F 3/0237; G06F 16/26; H04M 1/2748; H04N 21/439; H04N 21/4884
See application file for complete search history.

(56) References Cited

U.S. PATENT DOCUMENTS

| 6,359,636 | B1 | 3/2002 | Schindler et al. | |
| 8,782,722 | B1* | 7/2014 | Kellicker | H04N 7/0882 |
| | | | | 725/91 |
| 9,563,704 | B1 | 2/2017 | Greene et al. | |
| 10,692,497 | B1 | 6/2020 | Muske et al. | |
| 2002/0010916 | A1* | 1/2002 | Thong | H04N 5/278 |
| | | | | 725/1 |
| 2005/0188297 | A1* | 8/2005 | Knight | H04L 69/329 |
| | | | | 715/203 |

(Continued)

OTHER PUBLICATIONS

Office Action for U.S. Appl. No. 16/390,930, dated Nov. 27, 2020, Levit, "Systems for Generating Captions For Audio Content", 21 Pages.

(Continued)

*Primary Examiner* — Haoshian Shih
(74) *Attorney, Agent, or Firm* — Lee & Hayes, P.C.

(57) ABSTRACT

This disclosure describes, in part, techniques for providing captions with audio content. For instance, an electronic device may receive first data representing audio content and second data representing captions that are available for the audio content. The electronic device may then select portions of the captions for display while outputting the audio content. In some instances, the electronic device selects the portions using timestamps represented by the second data. For instance, the electronic device may select a portion of the captions such that the portion of the captions begins at a first pause within the audio content and/or ends at a second pause within the audio content. In some instances, the electronic device may also display graphical elements that indicate the current location within the captions.

20 Claims, 14 Drawing Sheets

(56) References Cited

U.S. PATENT DOCUMENTS

| | | | |
|---|---|---|---|
| 2005/0227614 A1* | 10/2005 | Hosking | H04N 7/165 |
| | | | 455/3.06 |
| 2010/0175082 A1 | 7/2010 | Blumenschein et al. | |
| 2010/0229078 A1* | 9/2010 | Otsubo | G11B 27/28 |
| | | | 715/203 |
| 2012/0089911 A1 | 4/2012 | Hosking et al. | |
| 2012/0309527 A1* | 12/2012 | Donnell | A63F 13/46 |
| | | | 463/31 |
| 2012/0316860 A1 | 12/2012 | Reitan | |
| 2013/0074133 A1* | 3/2013 | Hwang | G06F 16/48 |
| | | | 725/93 |
| 2013/0076981 A1 | 3/2013 | Labrozzi et al. | |
| 2014/0026101 A1* | 1/2014 | Pallakoff | G06F 3/0482 |
| | | | 715/841 |
| 2014/0201631 A1 | 7/2014 | Pornprasitsakul et al. | |
| 2015/0089368 A1* | 3/2015 | Lester | G06F 16/61 |
| | | | 715/716 |
| 2015/0100876 A1* | 4/2015 | Neugebauer | G06F 40/169 |
| | | | 715/233 |
| 2015/0208139 A1* | 7/2015 | Homyack | H04N 5/44508 |
| | | | 348/468 |
| 2017/0180809 A1 | 6/2017 | An et al. | |
| 2018/0061274 A1 | 3/2018 | Frahling | |
| 2019/0028772 A1 | 1/2019 | Perez | |
| 2019/0311639 A1 | 10/2019 | Contractor et al. | |
| 2019/0377826 A1 | 12/2019 | Soni et al. | |
| 2020/0051582 A1* | 2/2020 | Gilson | H04N 21/4307 |
| 2020/0084505 A1* | 3/2020 | Reid | G10L 21/10 |

OTHER PUBLICATIONS

Office Action for U.S. Appl. No. 16/390,930, dated Jul. 8, 2021, Levit, "Systems for Generating Captions for Audio Content". 30 pages.

* cited by examiner

700 ⤴

```
                    ( 7A )
                       │
                       ▼
┌─────────────────────────────────────────────────────────────┐
│ IDENTIFY, USING THE THIRD DATA, A SECOND PORTION OF THE CAPTIONS │
│   THAT IS ASSOCIATED WITH A SECOND PORTION OF THE AUDIO CONTENT  │
│                            ITEM                              │
│                            716                               │
└─────────────────────────────────────────────────────────────┘
                       │
                       ▼
┌─────────────────────────────────────────────────────────────┐
│           DISPLAY THE SECOND PORTION OF THE CAPTIONS         │
│                            718                               │
└─────────────────────────────────────────────────────────────┘
                       │
                       ▼
┌─────────────────────────────────────────────────────────────┐
│ OUTPUT, USING THE SECOND DATA, SECOND SOUND REPRESENTING THE │
│         SECOND PORTION OF THE AUDIO CONTENT ITEM             │
│                            720                               │
└─────────────────────────────────────────────────────────────┘
```

┌─────────────────────────────────────────────────────────────────┐
│  STORE FIRST DATA REPRESENTING A USER PROFILE, THE USER PROFILE │
│  BEING ASSOCIATED WITH A FIRST AUDIO CONTENT ITEM AND A SECOND  │
│                       AUDIO CONTENT ITEM                        │
│                              902                                │
└─────────────────────────────────────────────────────────────────┘
                                 ↓
┌─────────────────────────────────────────────────────────────────┐
│    RECEIVE SECOND DATA REPRESENTING A REQUEST TO PROVIDE        │
│                          CAPTIONS                               │
│                            904                                  │
└─────────────────────────────────────────────────────────────────┘
                                 ↓
┌─────────────────────────────────────────────────────────────────┐
│   DETERMINE THAT THE FIRST AUDIO CONTENT ITEM IS ASSOCIATED     │
│                    WITH FIRST CAPTIONS                          │
│                            906                                  │
└─────────────────────────────────────────────────────────────────┘
                                 ↓
┌─────────────────────────────────────────────────────────────────┐
│  SEND THIRD DATA INDICATING THAT THE FIRST AUDIO CONTENT ITEM   │
│             IS ASSOCIATED WITH THE FIRST CAPTIONS               │
│                            908                                  │
└─────────────────────────────────────────────────────────────────┘
                                 ↓
┌─────────────────────────────────────────────────────────────────┐
│  DETERMINE THAT THE SECOND AUDIO CONTENT ITEM IS NOT ASSOCIATED │
│                    WITH SECOND CAPTIONS                         │
│                            910                                  │
└─────────────────────────────────────────────────────────────────┘
                                 ↓
┌─────────────────────────────────────────────────────────────────┐
│  CAUSE THE SECOND CAPTIONS ASSOCIATED WITH THE SECOND AUDIO     │
│                 CONTENT ITEM TO BE GENERATED                    │
│                            912                                  │
└─────────────────────────────────────────────────────────────────┘
                                 ↓
┌─────────────────────────────────────────────────────────────────┐
│  DETERMINE THAT THE SECOND CAPTIONS HAVE BEEN GENERATED FOR THE │
│                     SECOND AUDIO CONTENT                        │
│                            914                                  │
└─────────────────────────────────────────────────────────────────┘
                                 ↓
┌─────────────────────────────────────────────────────────────────┐
│  CAUSE ONE OR MORE DATABASES TO BE UPDATED TO INDICATE THAT THE │
│  SECOND CAPTIONS ARE AVAILABLE FOR THE SECOND AUDIO CONTENT ITEM│
│                            916                                  │
└─────────────────────────────────────────────────────────────────┘
                                 ↓
┌─────────────────────────────────────────────────────────────────┐
│  SEND FOURTH DATA INDICATING THAT THE SECOND AUDIO CONTENT ITEM │
│              IS ASSOCIATED WITH THE SECOND CAPTIONS             │
│                            918                                  │
└─────────────────────────────────────────────────────────────────┘
```

FIG. 9

CAPTIONS FOR AUDIO CONTENT

BACKGROUND

Audiobooks have become popular for many users. For instance, a user may download an audiobook on the user's electronic device. The user may then use the electronic device to listen to the audiobook. In some instances, the user may have trouble following along with the audiobook being output by the electronic device. As such, to try to follow along with the audiobook, the user may acquire a physical book that is related to the audiobook. However, this may be burdensome for the user, as it requires the user to both listen to the audio being output by the electronic device while trying to follow along using text included in the physical book. Additionally, some audio content, including some audiobooks, may not have related physical text.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 7A-7B illustrate an example process for providing captions with an audio content item, according to various examples of the present disclosure.

FIG. 9 illustrates another example process for generating captions for an audio content item, according to various examples of the present disclosure.

DETAILED DESCRIPTION

Figure 1:
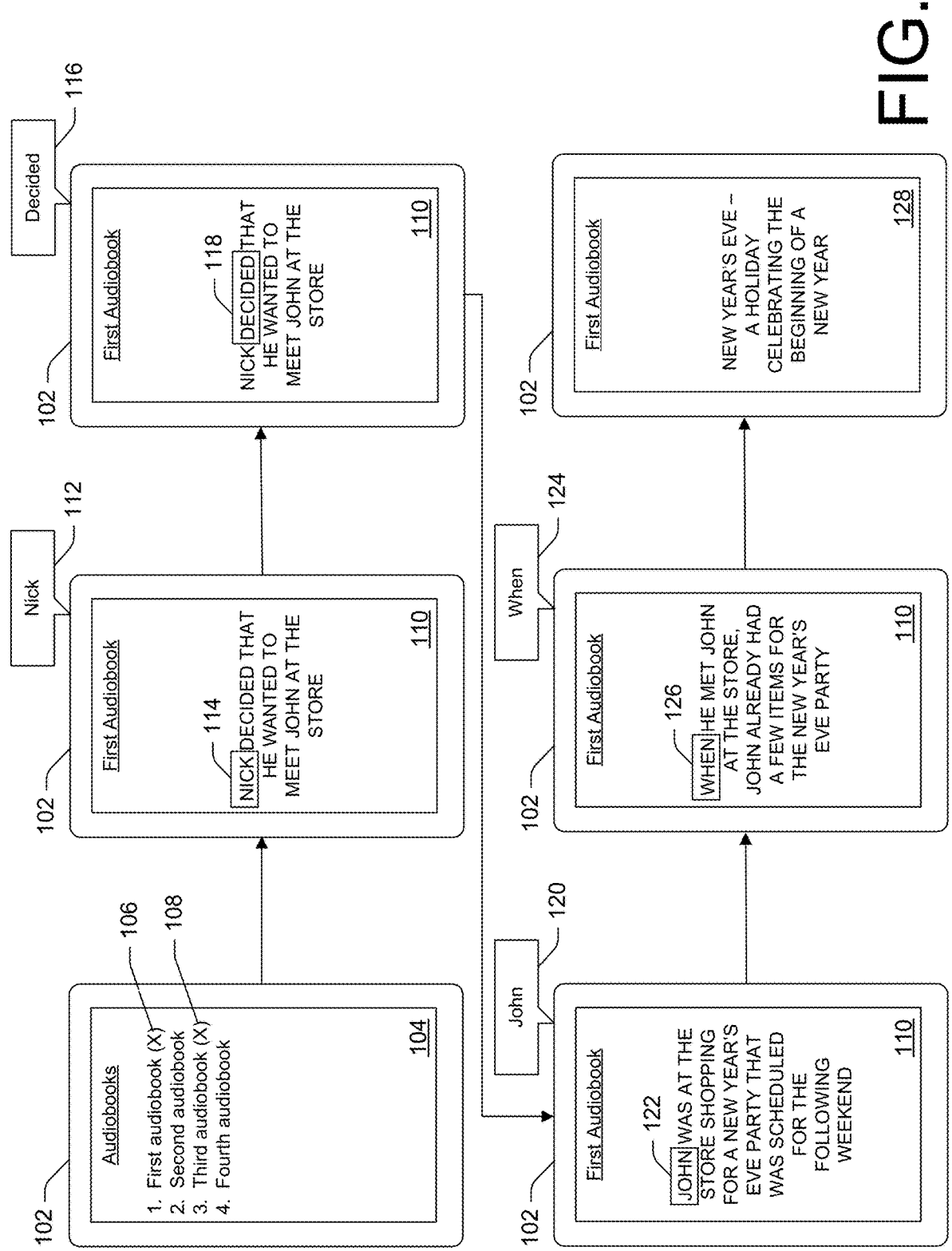
FIG. 1 illustrates an example of an electronic device providing captions an with audio content item, according to various examples of the present disclosure.

This disclosure describes, in part, systems and methods for providing captions with audio content. For instance, a user may use an electronic device to acquire (e.g., purchase, rent, borrow, etc.) audio content items from remote system(s). The audio content items may include, but are not limited to, audiobooks, podcasts, music, audio versions of text (e.g., documents, essays, reports, journals, etc.) and/or any other type of audio content item that may be output by electronic devices. In some instances, the remote system(s) may store data representing a user profile associated with the user. In such instances, when the user acquires audio content items, the remote system(s) may associate the audio content items with the user profile. For example, the remote system(s) may update a library with identifiers of the audio content items that are acquired by the user, where the library is associated with the user profile.

The remote system(s) may allow the user to opt in to a service provided by the remote system(s), where the service provides the user with captions for the audio content items. In some instances, to opt-in, the remote system(s) may receive, from the electronic device, a request to opt in to the service. Based on the request, the remote system(s) may update a status associated with the user profile to indicate that the user opted in to the service. In other instances, the remote system(s) may automatically opt the user into the service when the user creates the user profile.

In either instance, when the user opts in to the service, the remote system(s) may analyze the audio content items associated with the user profile to determine, for each audio content item, whether captions are available for the audio content item or whether captions are not available for the audio content item. If the captions are available for the audio content item, the remote system(s) may send, to the electronic device, data indicating that the captions are available for the audio content item. However, if the captions are not available for the audio content item, then the remote system(s) may cause the captions to be generated for the audio content item, which is described in detail below.

The user may use the electronic device to request an audio content item included in the library. Based on the request, the electronic device may receive, from the remote system(s), data representing the audio content. In some instances, the electronic device may further receive, from the remote system(s), data representing the captions. In such instances, the electronic device may receive a data file that includes the data representing the audio content and the data representing the captions or the electronic device may receive the data representing the captions separately from receiving the data representing the audio content. In some instances, the electronic device may be streaming the data representing the audio content and/or the data representing the captions.

However, in other instances, the electronic device may receive, from the remote system(s), data representing an address for retrieving the captions and/or decryption data (e.g., a decryption key) associated with the captions. The address may include a Universal Resource Locator (URL) and/or other type of address for retrieving the captions. In such instances, the electronic device may use the address to retrieve the data representing the captions. If the data representing the captions is encrypted, the electronic device may then use the decryption data to decrypt the data.

After retrieving the captions, the electronic device may output the audio content item using one or more speakers. While outputting the audio content item, the electronic device may display a portion of the captions that is related to the audio content item. For example, when the electronic device outputs a portion of the audio content item, such as the word "Home", the electronic device may display a portion of the captions that is related to the portion of the audio content item, such as the word "Home". As the electronic device continues to output additional portions of the audio content item, the electronic device may continue to display portions of the captions that are related to the additional portions of the audio content item.

For instance, the data representing the captions may include timestamps for various portions of the captions. The portions of the captions may include, but are not limited to, characters (e.g., letters, numbers, punctuation marks, etc.), words, sentences, paragraphs, and/or the like included in the captions. For example, and for each word, the data representing the captions may include a first timestamp representing a beginning of the word and/or a second timestamp representing the end of the word. The timestamps may correspond to positions within the audio content item. For example, the first timestamp for a word may indicate that the start of the word occurs at a first time within the audio content item and the second timestamp for the word may indicate that the end of the word occurs at a second time within the audio content item. The time may be within milliseconds, seconds, and/or the like. As such, the electronic device may use the timestamps to determine which word to display and/or highlight while the electronic device is outputting the audio content item. For example, and using the example above, when the electronic device is outputting a portion of the audio content item that falls between the first time and the second time within the audio content item, then the electronic device may highlight the word associated with the first timestamp and the second timestamp.

In some instances, the electronic device may select portions of the captions for displaying while outputting the audio content item. For example, the electronic device may determine a maximum number of words (and/or characters) that the electronic device can display at a single instance. The electronic device may determine the maximum number of words (and/or characters) using one or more factors. The one or more factors may include, but are not limited to, a size of the display of the electronic device, an orientation of the display of the electronic device, a size of the font (which may be selected by the user), a type of font (which may be selected by the user), input data from the user that indicates the maximum number of words (and/or characters), and/or the like. Based on the maximum number of words (and/or characters), the electronic device may then select a portion of the captions.

For example, the electronic device may select the portion of the captions such that the portion includes less words than the maximum number of words (and/or less characters than the maximum number of characters). Additionally, the electronic device may select the portion of the captions such that the beginning of the portion and/or the end of the portion occurs near pauses within the audio content item. For example, the electronic device may use the timestamps to determine when there are pauses between words within the captions that are greater than a threshold time. The threshold time may include, but is not limited to, ten milliseconds, fifty milliseconds, one second, and/or any other threshold. The electronic device may then select a portion of the captions such that the beginning of the portion occurs right after a first pause and/or an ending of the portion occurs right before a second pause.

In some instances, such as when the electronic device identifies multiple pauses, the electronic device may select a pause associated with the end of the portion. For a first example, the electronic device may select the maximum pause (e.g., the longest pause). For a second example, the electronic device may select the first identified pause. Still, for a third example, the electronic device may select the last identified pause. By selecting the portion using such techniques, the electronic device is able to better align the portion of the captions with the audio content item. For example, the pauses may allow the electronic device to display the portion of the captions during an entirety of the time that the electronic device is outputting the corresponding portion of the audio content item.

The electronic device may continue to perform the techniques described above to continue to select new portions of the captions while the electronic device is outputting the audio content item. In some instances, the electronic device selects and/or displays a new portion of the captions based on the electronic device outputting an entirety of the portion of the audio content item that corresponds to a current portion of the captions being displayed by the electronic device. In some instances, the electronic device selects and/or displays a new portion of the captions based on the electronic device receiving, from the user, an input to move to a different portion of the audio content item. For instance, the input may include a first input to move backwards within the audio content item (e.g., rewind), a second input to move forward within the audio content item (e.g., fast forward), a third input to skip to a new portion of the audio content item (e.g., skip to a new paragraph, chapter, etc.), and/or the like.

In some instances, while displaying the captions, the electronic device may further display graphical element(s) indicating the current position within the audio content item. A graphical element may include, but is not limited to, a shading, a box, an arrow, a highlight, and/or any other type of indicator. For example, if the electronic device is currently outputting a word included in the audio content item, then the electronic device may display a graphical element indicating the corresponding word included in the captions. In instances where the electronic device displays the graphical element(s), the electronic device may use the timestamps to identify the portion of the captions that corresponds to the portion of the audio content item being output by the electronic device. For example, the electronic device may determine a current position within the audio content item, and then the electronic device may use the timestamps to determine which word included in the captions corresponds to the current position.

In some instances, the electronic device may allow the user to customize the displaying of the captions. For example, the electronic device may allow the user to select a size of the font, a type of the font, a color of the font, a type of graphical element to use to indicate a current position within the audio content item, a background for the captions, a language for the captions, and/or the like. Additionally, or alternatively, in some instances, the electronic device may allow the user to customize the outputting of the audio content item. For example, the electronic device may allow the user to select a speed for outputting the audio content item, a language for outputting the audio content item, a volume for outputting the audio content item, and/or the like.

In some instances, when displaying the captions, the electronic device may operate in different modes based on the orientation of the electronic device. For example, the electronic device may operate in a first mode when the electronic device is in a first orientation (e.g., a portrait orientation). While in the first mode, the electronic device may display the caption, but allow other types of notifications, messages, and/or the like to be displayed. Additionally, the electronic device may operate in a second mode when the electronic device is in a second orientation (e.g., a landscape orientation). While in the second mode, the electronic device may display the captions without providing any other distractions to the user. For instance, the electronic device may refrain from displaying other notifications, messages, and/or the like. This way the user is not distracted when viewing the captions.

In some instances, the electronic device may allow the user to interact with the captions. For instance, the electronic device may allow the user to select one or more words. In some instances, to select one or more words, the electronic device may receive an input from a user, where the input corresponds to the user selecting the one or more words for a threshold amount of time. The threshold amount of time may include, but is not limited to, one second, two seconds, three seconds, and/or the like. Based on the selection, the electronic device may display additional information associated with the one or more words. For instance, the electronic device may display a translation of the one or more words, a definition of the one or more words, external information associated with the one or more words, and/or the like. The electronic device may retrieve the external information from an external source, such as WIKIPEDIA ©, GOOGLE ©, and/or any other external source.

For a first example, if the word includes an object, then the electronic device may display additional information about the object. The additional information may include a definition of the object, external information associated with the object, and/or the like. For a second example, if the word includes a name of a character, then the electronic device may display additional information about the character. In some instances, the data representing the audio content item and/or the data representing the captions includes the additional information. Additionally, or alternatively, in some instances, the electronic device may use one or more network resources (e.g., the Internet) to retrieve the additional information.

As described above, the remote system(s) may generate the captions for the audio content items. In some instances, the remote system(s) identify the audio content items for generating captions when users opt in to the service. For example, when the user opts in to the service, the remote system(s) may analyze the user profile (e.g., the library of audio content items) and, based on the analysis, identify audio content items that do not have available captions. Additionally, or alternatively, in some instances, the remote system(s) identify audio content items for generating captions when users acquire new audio content items. For example, if the user acquires a new audio content item, the remote system(s) may determine if the new audio content item includes available captions. If the new audio content item does not include available captions, then the remote system(s) may identify the audio content item. Additionally, or alternatively, in some instances, the remote system(s) identify audio content items for generating captions when new audio content items and/or new versions of audio content items are uploaded to the remote system(s).

In some instances, the remote system(s) determine priorities for generating the captions for the audio content items. In such instances, the remote system(s) determine the priorities using one or more factors associated with the audio content items. The one or more factors may include, but are not limited to, times at which the audio content items were last accessed (e.g., requested, displayed, acquired, etc.), a number of times that the audio content items were accessed (e.g., popularity of the audio content items), times at which the audio content items were created and/or uploaded to the remote system(s), requests received for generating the captions, a number of requests received for generating captions, and/or the like.

For a first example, when a user opts in to the service, the remote system(s) may determine that the user profile is associated with a first audio content item and a second audio content item, both of which do not have available captions. The remote system(s) may then determine that the user last accessed the first audio content item at a first time and last accessed the second audio content item at a second, more recent time. As such, the remote system(s) may use the first time and the second time to determine a first priority for the first audio content item and a second priority for the second audio content item. In some instances, since the second audio content item was last accessed more recently than the first audio content item, the second priority may be greater than the first priority. In other words, the remote system(s) may generate captions for the second audio content item before generating captions for the first audio content item.

For a second example, a user may have already opted in to the service, where the remote system(s) are waiting to generate captions for a first audio content item previously acquired by the user. While waiting, the remote system(s) may receive data indicating that the user acquired a second audio content item, where the second audio content item does not have available captions. As such, the remote system(s) may determine a first priority for first audio content item (and/or update a previous priority for the first audio content item) and a second priority for the second audio content item. In some instances, since the second audio content item was recently acquired by the user, such that the user more recently accessed (e.g., acquired) the second audio content item as compared to the first audio content item, the second priority may be greater than the first priority. In other words, the remote system(s) may generate the captions for the second audio content item before generating the captions for the first audio content item.

In some instances, based on the number of audio content items that are waiting to be processed, the remote system(s) may separate the audio content items into different groups. For instance, the remote system(s) may generate a first group of audio content items, a second group of audio content items, and/or the so forth. In some instances, a first group of audio content items may include high priority audio content items and a second group of audio content items may include low priority audio content items. For a first example, the first group may include audio content items that include the top ten (and/or any other number of) priorities and the second group may include all other audio content items. For a second example, the first group may include audio content items that include priorities satisfying (e.g., equal to or greater than) a threshold priority, and the second group may include audio content items that include priorities that do not satisfy (e.g., are below) the threshold priority.

The remote system(s) may then generate the captions for the audio content items. In some instances, to generate the captions, the remote system(s) may process the audio content items using one or more algorithms associated with speech processing. The one or more algorithms associated with speech processing may include, but are not limited to, one or more algorithms associated with automatic speech recognition (ASR), one or more algorithms associated with natural language understanding (NLU), and/or any other type of algorithm that analyzes user speech represented by audio content in order to generate text representing the user speech.

In some instances, when processing an audio content item, the remote system(s) may process one or more tracks of the audio content item, where a track includes a portion of the audio content item. For example, a track may include a word, a sentence, a paragraph, a page, chapter, and/or the like of the audio content item. Based on the processing, the remote system(s) may generate, for individual tracks, a transcript for the track, where the transcript includes, but is not limited to, a plain text file representing the track, binary code representing the text, and/or the like. The remote system(s) may then generate the captions using the transcripts. In some instances, to generate the captions, the remote system(s) may convert the one or more transcripts to a specific format. For instance, the remote system(s) may generate, for various portions (e.g., words, sentences, paragraphs, pages, chapters) of the one or more transcripts, a first timestamp indicating a start of the portion, a second timestamp indicating an end of the portion, text included in the portion, and/or the like. The remote system(s) may then generate the captions using the first timestamp, the second timestamp, the text, and/or the like for each portion.

In some instances, when generating the captions for the audio content items, the remote system(s) may determine scores associated with the captions. For example, and for an audio content item, the remote system(s) may determine individual scores for individual portions (e.g., tracks, letters, words, sentences, paragraphs, numbers, etc.) of the captions. The respective score for a portion of the captions may indicate a likelihood that the portion of the captions correctly reflects the corresponding portion of the audio content item (e.g., that the text in the captions is correct). The remote system(s) may then determine a total score for the captions based on the scores for the portions of the captions. In some instances, the determine the total score, the remote system(s) may remove and/or zero out scores that are lower than a threshold score. The remote system(s) may then divide a sum of the remaining scores by the total number of portions. While this is just one example of determining the total score for the captions, in other examples, the remote system(s) may use other techniques to determine the total score the captions.

In some instances, the remote system(s) may use the scores for the portions to perform one or more functions. For a first example, if the score is below a threshold score, the remote system(s) may generate new captions for the audio content item. For a second example, and again if the score is below a threshold score, the remote system(s) may cause at least a portion of the captions to be reviewed and/or updated manually by a user. Still, for a third example, when a user requests the captions, the remote system(s) may notify the user about the score for the captions.

In some instances, after generating the captions, the remote system(s) may store data representing the captions in one or more databases. When storing the data, the remote system(s) may initially encrypt the data using encryption data, such one or more keys. Additionally, or alternatively, in some instances, after generating the captions, the remote system(s) may store data representing information about the captions in the one or more databases. The information may include, but is not limited to, identifier(s) of the audio content item for which the captions are associated, identifier(s) associated with the captions, an address for retrieving the captions, a version of the audio content item, a version of the captions, a time at which the captions were generated, the score(s) for the captions, the decryption data associated with the captions, a current status associated with the captions, and/or the like. The current status may include, but is not limited to, available, not available, being generated, expired, and/or the like.

In some instances, the remote system(s) may generate data indicating a time at which an event associated with the captions last occurred. In such instances, each time a new event associated with the captions occurs, the remote system(s) may update the data to indicate a new time at which the new event occurred. For example, the remote system(s) may update the data to indicate a new time each time a user requests the audio content item, each time a user requests the captions, each time a user outputs the audio content item, each time a user displays the captions, each time a user acquires the audio content item, each time a user that has acquired the audio content item opts in to the service, and/or the like.

In some instances, the remote system(s) may then use the time to determine whether to remove the captions form the one or more databases. For example, the remote system(s) may use the time to determine that a threshold period of time has elapsed since the last event associated with the captions occurred. The threshold period of time may include, but is not limited to, one day, fifth days, ninety days, one hundred days, and/or any other time period. Based on determining that the threshold period of time has elapsed, the remote system(s) may remove the data representing the captions from the one or more databases. Additionally, the remote system(s) may update the information (e.g., the status) associated with the captions to indicate that the captions were removed, the captions are currently unavailable, and/or the captions are expired. Furthermore, in some instances, the remote system(s) may send users notifications indicating that the captions are no longer available for the audio content item.

In instances where the remote system(s) remove the data representing the captions, the remote system(s) may again use the processes described herein to generate new captions for the audio content item when a user requests to access the audio content item. For example, if a new user purchases the audio content item, the remote system(s) may generate new captions for the audio content item. The remote system(s) may then store data representing the new captions within the one or more databases. Additionally, the remote system(s) may update the information (e.g., the status) to indicate that the new captions were generated and/or the captions are currently available. Furthermore, the remote system(s) may generate data indicating a new time indicating the last event associated with the captions.

By performing the techniques described herein, the remote system(s) are configured to provide requesting users with captions for audio content item. The users can then use the captions to better follow along with the audio content item, which may provide the users with a better understanding of the audio content item. Additionally, by performing the techniques described herein, the remote system(s) are able to generate captions for audio content item based on priorities for the captions. As such, the remote system(s) are able to provide the users with higher priority captions first, which the users are likely to use when listening to audio content items, before providing the users with lower priority captions, which the users may be less likely to use.

As described herein, an identifier may include, but is not limited to, a numerical identifier, an alphabetic identifier, a mixed numerical and alphabetic identifier, an Amazon Standard Identification Number (ASIN), a stock keeping unit (SKU), a serial number, and/or any other type of identifier that can be used to identify data.

FIG. 1 illustrates an example of an electronic device 102 providing captions with audio content, according to various examples of the presents disclosure. For instance, in the example of FIG. 1, a user associated with the electronic device 102 may have opted in to a service that provides the user with captions for audio content items. As shown, the electronic device 102 may initially display a first user interface 104 that includes a list of audiobooks. In some instances, the list of audiobooks may include audiobooks that have been acquired by the user. As shown, the list of audiobooks includes four separate audiobooks. Additionally, the first user interface 104 includes a first graphical element 106 indicating that captions are available for the first audiobook and a second graphical element 108 indicating that captions are available for the third audiobook. While this is just one example of graphical elements 106-108 that may be used to indicate that captions are available for audiobooks, in other examples, the first user interface 104 may include any other type of graphical elements.

In some instances, although not illustrated in the example of FIG. 1, the first user interface 104 may include graphical elements that indicate the status of the captions for the second audiobook and the fourth audiobook. For example, a graphical element for the second audiobook may indicate that the status of the captions is "Not Available" or "Being Generated". Additionally, a graphical element for the fourth audiobook may indicate that the status of the captions is "Not Available" or "Being Generated". Additionally, in some instances, the first user interface 104 may indicate an estimated time for generating the captions for the second audiobook and/or the captions for the fourth audiobook.

In the example of FIG. 1, the electronic device 102 may receive an input representing a selection of the first audiobook. Based on the input, the electronic device 102 may send, to the remote system(s), data representing a request for the first audiobook and/or a request for the captions associated with the first audiobook. The electronic device 102 may then receive, from the remote system(s), data representing the first audiobook. Additionally, in some examples, the electronic device 102 may receive, from the remote system(s), data representing the captions and/or decryption data associated with the captions. In other examples, the electronic device 102 may receive, from the remote system(s), data representing an address for retrieving the captions and/or the decryption data associated with the captions. The electronic device 102 may then use the address to retrieve the data representing the captions. Additionally, in either of the examples above, the electronic device 102 may use the decryption data to decrypt the data representing the captions.

The electronic device 102 may then select a first portion of the captions, using the techniques described herein (e.g., using the timestamps). For example, the electronic device 102 may select the first portion of the captions such that a beginning of the first portion corresponds to a starting position within the first audiobook and an ending of the first portion occurs right before a first pause within the first audiobook. After the selection, the electronic device 102 may display a second user interface 110 that includes the first portion of the captions. As shown, the first portion of the captions includes the text "NICK DECIDED THAT HE WANTED TO MEET JOHN AT THE STORE".

While displaying the first portion of the captions, the electronic device 102 may be outputting the first audiobook. For example, the electronic device 102 may output first sound representing a first portion of the first audiobook, which is represented by 112. In the example of FIG. 1, the first portion of the first audiobook includes the word "Nick". While outputting the first portion of the first audiobook, the electronic device 102 may display a graphical element 114 indicating the current position within the first audiobook. For example, as the electronic device 102 is outputting the word "Nick" from the first audiobook, the electronic device 102 is further displaying the graphical element 114 highlighting the word "NICK" from the first portion of the captions.

As the electronic device 102 continues to output additional portions of the first audiobook, the electronic device 102 may continue to indicate to the user where the user is within the first audiobook. For example, the electronic device 102 may output second sound representing a second portion of the first audiobook, which is represented by 116. While outputting the second portion of the first audiobook, the electronic device 102 may display a graphical element 118 indicating the second portion within the first audiobook. For example, as the electronic device 102 is outputting the word "Decided" from the first audiobook, the electronic device 102 is further displaying the graphical element 118 highlighting the word "DECIDED" from the first portion of the captions. The electronic device 102 may continue this process until reaching the end of the first portion of the captions, which includes the word "STORE".

While outputting the portion of the first audiobook that corresponds to the first portion of the captions, the electronic device 102 may select a second portion of the captions, using the techniques described herein. For example, the electronic device 102 may select the second portion of the captions such that a beginning the second portion occurs right after the first pause within the first audiobook (e.g., right after the first portion of the captions) and/or an end of the second portion occurs right before a second pause within the first audiobook. After the selection, the electronic device 102 may display, using the second user interface 110, the second portion of the captions. As shown, the second portion of the captions includes the text "JOHN WAS AT THE STORE SHOPPING FOR A NEW YEAR'S EVE PARTY THAT WAS SCHEDULED FOR THE FOLLOWING WEEKEND".

In the example of FIG. 1, the second portion of the captions includes more words and/or characters than the first portion of the captions. In some instances, this is because of the pauses in the first audiobook. For example, the first portion of the captions began at the starting position within the first audiobook and ended at the first pause within the first audiobook, and the second portion of the captions began at the first pause within the first audiobook and ended at the second pause within the first audiobook. The first audiobook represents less user speech between the starting position and the first pause than between the first pause and the second pause. This may cause the second portion of the captions to include more words and/or characters than the first portion of the captions.

While displaying the second portion of the captions, the electronic device 102 may continue to output the first audiobook. For example, the electronic device 102 may output third sound representing a third portion of the audiobook, which is represented by 120. In the example of FIG. 1, the third portion of the first audiobook includes the word "John". While outputting the third portion of the first audiobook, the electronic device 102 may display a graphical element 122 indicating the current position within the first audiobook. For example, as the electronic device 102 is outputting the word "JOHN" from the first audiobook, the electronic device 102 is further displaying the graphical element 122 highlighting the word "JOHN" from the second portion of the captions.

In some instances, while displaying the second portion of the captions, the electronic device 102 may receive an input associated within moving to a different position within the first audiobook. For example, the input may be associated with skipping to a next portion (e.g., next sentence, next paragraph, next chapter, etc.) of the first audiobook. Based on the input, the electronic device 102 may select a third portion of the captions, using the techniques described herein. For example, the electronic device 102 may select the third portion of the captions such that a beginning of the third portion corresponds to the new position within the first audiobook and/or an end of the third portion occurs right before a third pause. After the selection, the electronic device 102 may display, using the second user interface 110, the third portion of the captions. As shown, the third portion of the captions includes the text "WHEN HE MET JOHN AT THE STORE, JOHN ALREADY HAD A FEW ITEMS FOR THE NEW YEAR'S EVE PARTY".

While displaying the third portion of the captions, the electronic device 102 may continue to output the first audiobook. For example, the electronic device 102 may output fourth sound representing a fourth portion of the first audiobook, which is represented by 124. In the example of FIG. 1, the fourth portion of the first audiobook includes the word "When". While outputting the fourth portion of the first audiobook, the electronic device 102 may display a graphical element 126 indicating the current position within the first audiobook. For example, as the electronic device 102 is outputting the word "When" from the first audiobook, the electronic device 102 is further displaying the graphical element 126 highlighting the word "WHEN" from the third portion of the captions.

In some instances, and as illustrated in the example of FIG. 1, the electronic device 102 may receive an input selecting a portion of the captions. For example, the input may include a selection of the words "NEW YEAR'S EVE". Based on the input, the electronic device 102 may retrieve additional information associated with the portion of the captions and display a third user interface 128 that includes the additional information. For example, the additional information indicates that New Year's Eve is "A HOLIDAY CELEBRATING THE BEGINNING OF A NEW YEAR." In some instances, the electronic device 102 continues to display the third user interface 128 until receiving, from the user, an additional input to once again continue with the first audiobook. Additionally, or alternatively, in some instances, the electronic device 102 continues to display the third user interface 128 for a threshold period of time (e.g., thirty seconds, one minute, five minutes, etc.).

Figure 2:
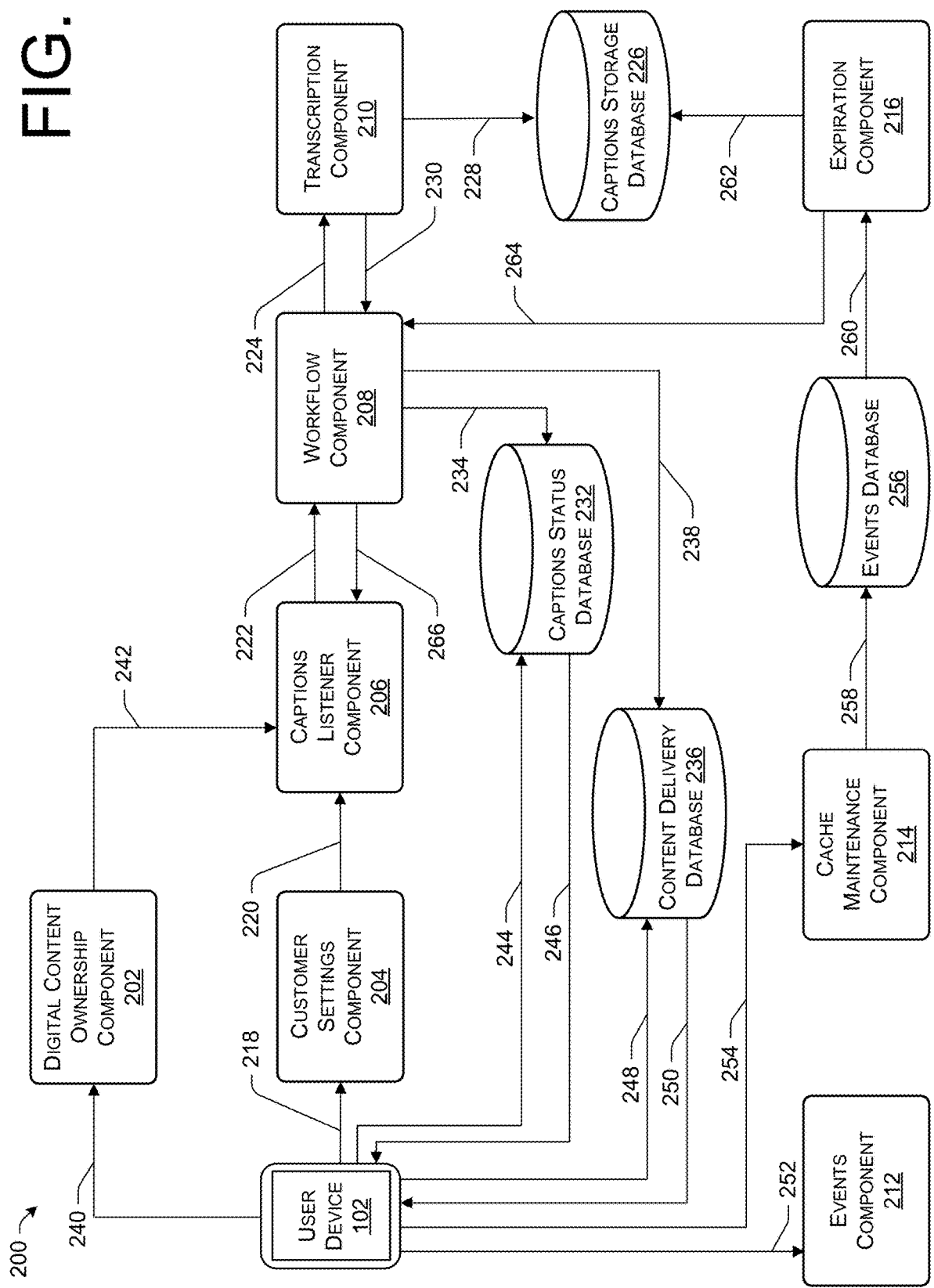
FIG. 2 illustrates an example environment for providing a user with captions for audio content items, according to various examples of the present disclosure.

FIG. 2 illustrates an example environment 200 for providing a user with captions for audio content items, according to various examples of the present disclosure. In the example of FIG. 2, there are various inputs that the electronic device 102 may receive that cause a digital content ownership component 202, a customer settings component 204, a captions listening component 206, a workflow component 208, a transcription component 210, an events component 212, a cache maintenance component 214, and/or an expiration component 216 to perform one or more processes. In some instances, the components 202-216 may be included in a single remote system. In other instances, one or more of the components 202-0216 may be included in different remote systems.

In the example of FIG. 2, the electronic device 102 may receive a first input associated with opting in to the service (and/or requesting captions that have been expired by the expiration component 216). Based on the input, the customer settings component 204 may receive data indicating that the user wishes to opt in to the service (and/or is requesting the captions), which is represented by 218. In some instances, the customer settings component 204 may retrieve identifier(s) associated with the user and send data representing the identifier(s) to the captions listener component 206, which is represented by 220. The captions listener component 206 may then analyze the library of audio content items associated with the user profile to identify audio content items that are not currently associated with captions. The captions listener component 206 may then prioritize the audio content items, using the techniques described herein.

For a first example, the captions listener component 206 may prioritize the audio content items using one or more factors. The one or more factors may include, but are not limited to, times at which the audio content items were last accessed (e.g., requested, displayed, acquired, etc.) by the electronic device 102, a number of times that the audio content items were last accessed (e.g., popularity of the audio content items) by the electronic device 102, times at which the audio content items were created and/or uploaded, requests received from the electronic device 102 for generating the captions, a number of requests received from the electronic device 102 for generating the captions, and/or the like. In some instances, the captions listener component 206 prioritizes the audio content items into one or more groups (e.g., a high priority group and a low priority group).

The workflow component 208 may then receive data indicating the audio content items and/or the priorities for the audio content items, which is represented by 222. The workflow component 208 then sends, to the transcription component 210, data representing identifiers of the audio content items, which is represented by 224. In some instances, the workflow component 208 sends the data representing the identifiers based on the priorities. For example, the workflow component 208 may send data representing a first identifier of a first audio content that includes a highest priority, followed by sending data representing a second identifier of a second audio content that includes a second highest priority, and/or so forth.

The transcription component 210 receives the data and, in response, generates captions for the audio content items, which is described in detail below. The transcription component 210 then stores data representing the captions in the captions storage database 226, which is represented by 228. Additionally, the transcription component 210 sends data associated with the captions to the workflow component 208, which is represented by 230. The data may include, but is not limited to, identifier(s) associated with the captions, score(s) associated with the captions, location(s) for retrieving the captions, and/or the like.

If the captions were generated using tracks, then the workflow component 208 may generate the captions using the tracks. The workflow component 208 may then update a captions status database 232, which is represented by 234. In some instances, to update the captions status database 232, the workflow component 208 may store data related to the captions in the captions status database 232. The data may include, but is not limited to, the identifier(s) of the captions, the score(s) for the captions, status(es) of the captions (e.g., Available), and/or the like. Additionally, the workflow component 208 may store data representing the captions in a content delivery database 236, which is represented by 238. In some instances, the data representing the captions is encrypted before being stored in the content delivery database 236.

In the example of FIG. 2, the electronic device 102 may further receive a second input associated with acquiring a new audio content item. Based on the input, the digital content ownership component 202 may receive data representing identifier(s) associated with the audio content item, which is represented by 240. The digital content ownership component 202 may then determine whether captions are already available for the audio content item. If the captions are already available for the audio content item, then the digital content ownership component 202 may send, to the electronic device 102, data indicating that the captions are available. However, if the captions are not already available for the audio content item, then the digital content ownership component 202 may determine whether captions can be generated for the audio content item.

In some instances, the digital content ownership component 202 makes the determination based on one or more factors. The one or more factors may include, but are not limited to, whether the user has rights to listen to the audio content item, whether the user has rights to receive the captions (e.g., whether the user is opted in to the service), whether an owner of the audio content item has approved or not approved the generating of captions, and/or the like. If the digital content ownership component 202 determines that the captions cannot be generated for the audio content item, then the digital content ownership component 202 may send, to the electronic device 102, data indicating that the captions cannot be generated. However, if the digital content ownership component 202 determines that the captions can be generated for the audio content item, then the digital content ownership component 202 may send data representing identifier(s) of the audio content item to the captions listener component 206, which is illustrated by 242.

The captions lister component 206 may then prioritize the audio content item, using the techniques described herein. In some instances, since the audio content item was recently accessed by the user (e.g., the user recently acquired the audio content item), then the audio content item may be prioritized over other audio content items that are waiting to be processed by the workflow component 208. The workflow component 208 and the transcription component 210 may then perform the processes described herein to generate the captions for the audio content item.

In the example of FIG. 2, the electronic device 102 may further receive a third input associated with viewing a status of captions for an audio content item. Based on the input, the electronic device 102 may query the captions status database 232 to determine the status of the captions, which is represented by 244. Based on the query, the electronic device 102 may receive data representing the status, which is represented by 246. The electronic device 102 may then display the status to the user. The status may include, but is not limited to, that the captions are available, that the captions are not available, that the captions are being generated, that the captions have been expired, and/or the like.

In the example of FIG. 2, the electronic device 102 may further receive a fourth input associated with viewing captions for an audio content item. Based on the input, the electronic device 102 may retrieve data representing the captions from the content delivery database 236. For example, the electronic device 102 may send, to the content delivery database 236, data representing a request for the captions, which is represented by 248. In some instances, the requests may include the identifier(s) associated with the captions and/or the identifier(s) associated with the audio content item. The electronic device 102 may then receive, from the content delivery database 236, the data representing the captions, which is represented by 250. In some instances, the data representing the captions is encrypted. In such instances, the electronic device 102 may decrypt the data represented the captions.

In the example of FIG. 2, the events component 212 may receive data indicating that an event that has occurred with an audio content item, which is represented by 252. Additionally, the cache maintenance component 214 may receive data indicating that the event has occurred with the audio content item, which is represented by 254. The event may include the user requesting the audio content item, the user requesting the captions, the electronic device 102 outputting the audio content item, the electronic device 102 displaying the captions, the user acquiring the audio content time, and/or the like.

The cache maintenance component 214 may then update an events database 256 to indicate that the event has occurred, which is represented by 258. In some instances, to update the events database 256, the cache maintenance component 214 may store data indicating the type of event and/or a time at which the event occurred. The expiration component 216 may then receive, from the events database 256, data indicating when the last event occurred with the audio content item, which is represented by 260. Additionally, the expiration component 216 may determine whether a threshold period of time has elapsed since the last event occurred. If the expiration component 216 determines that the threshold period of time has not elapsed, then the expiration component 216 may refrain from taking one or more actions. However, if the expiration component 216 determines that the threshold period of time has elapsed, then the expiration component 216 may take one or more actions.

For instance, the expiration component 216 may remove the data representing the captions from the captions storage database 226, which is represented by 262. In some instances, to remove the data, the expiration component 216 may send, to the captions storage database 226, data representing an instruction to delete the data representing the captions. The expiration component 216 may further send, to the workflow component 208, data indicating that the captions for the audio content item have expired, which is represented by 264. The workflow component 208 may then update the captions status database 232, which is also represented by 234. In some instances, to update the captions status database 232, the workflow component 208 may update the status of the captions to indicate that the captions or expired and/or not available.

Additionally, the workflow component 208 may remove the data representing the captions from the content delivery database 236, which may also be represented by 238. In some instances, to remove the data, the workflow component 208 may send, to the content delivery database 236, data representing an instruction to delete the data representing the captions.

In the example of FIG. 2, the workflow component 208 may send, to the captions listener component 206, data indicating that a new version of an audio content item is available, which is represented by 266. In some instances, the captions listener component 206 may then add the new version of the audio content item to the list of audio content items that are waiting to be processed. The workflow component 208 and the transcription component 210 may then generate the captions for the new version of the audio content item.

Figure 3:
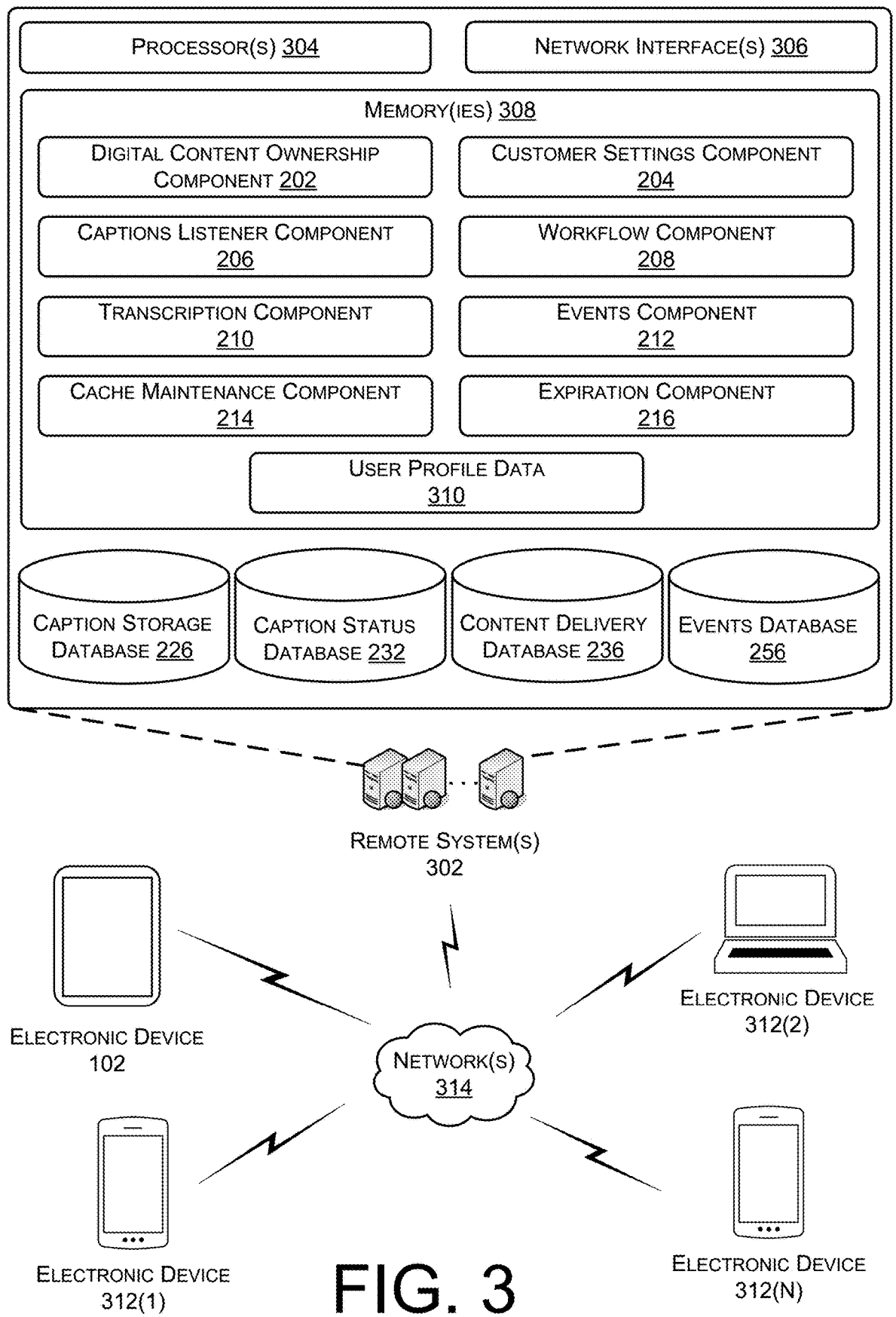
FIG. 3 illustrates a block diagram of remote system(s) that provide captions with audio content items, according to various examples of the present disclosure.

FIG. 3 illustrates a block diagram of remote system(s) 302 that provide captions with audio content items, according to various examples of the present disclosure. As shown, the remote system(s) 302 may include processor(s) 304, network interface(s) 306, and memory(ies) 308. The memory(ies) 308 store the digital content ownership component 202, the customer settings component 204, the captions listener component 206, the workflow component 208, the transcription component 210, the events component 212, the cache maintenance component 214, and the expiration component 216. The remote system(s) 302 further include the captions storage database 226, the captions status database 232, the content delivery database 236, and the events database 256.

In some instances, the processor(s) 304, the network interface(s) 306, the memory(ies) 308, the components 202-216, and the database 226, 232, 236, and 252 may be included in a single remote system 302. In other instances, one or more of the processor(s) 304, one or more of the network interface(s) 306, one or more of the memory(ies) 308, one or more of the components 202-216, and/or one or more of the database 226, 232, 236, and 252 may be included multiple remote systems 302. For example, a first remote system 302 may include first processor(s) 304, first network interface(s) 306, first memory(ies) 308, one or more of the components 202-216, and one or more of the database 226, 232, 236, and 252. A second remote system 302 may then include second processor(s) 304, second network interface(s) 306, second memory(ies) 308, one or more of the components 202-216, and one or more of the database 226, 232, 236, and 252. In other words, the components 202-216 and the databases 226, 232, 236, and 252 may be separate among many remote systems 302.

The remote system(s) 302 may store user profile data 310 representing user profiles of users. The user profile for a user may indicate at least whether the user is opted in to the service and audio content items acquired by the user.

As further illustrated in the example of FIG. 3, the remote system(s) 302 communicate with the electronic device 102 as well as other electronic devices 312(1)-(N) over network(s) 314. The remote system(s) 302 may communicate with the electronic device 102 as well as the other electronic devices 312(1)-(N) in order to provide captions with audio content items, as described herein.

As used herein, a processor, such as the processor(s) 304, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory(ies) 308, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 306, may enable data to be sent between devices. For example, the network interface(s) 306 may enable data to be sent between the remote system(s) 302, the electronic device 102, the electronic devices 312(1)-(N), and/or with one or more other remote systems, as well as other networked devices. The network interface(s) may include one or more network interface controllers (NICs) or other types of transceiver devices to send and receive messages over the network(s) 314.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

The operations and/or functionalities associated with and/or described with respect to the components of the remote system(s) 302 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

Figure 4:
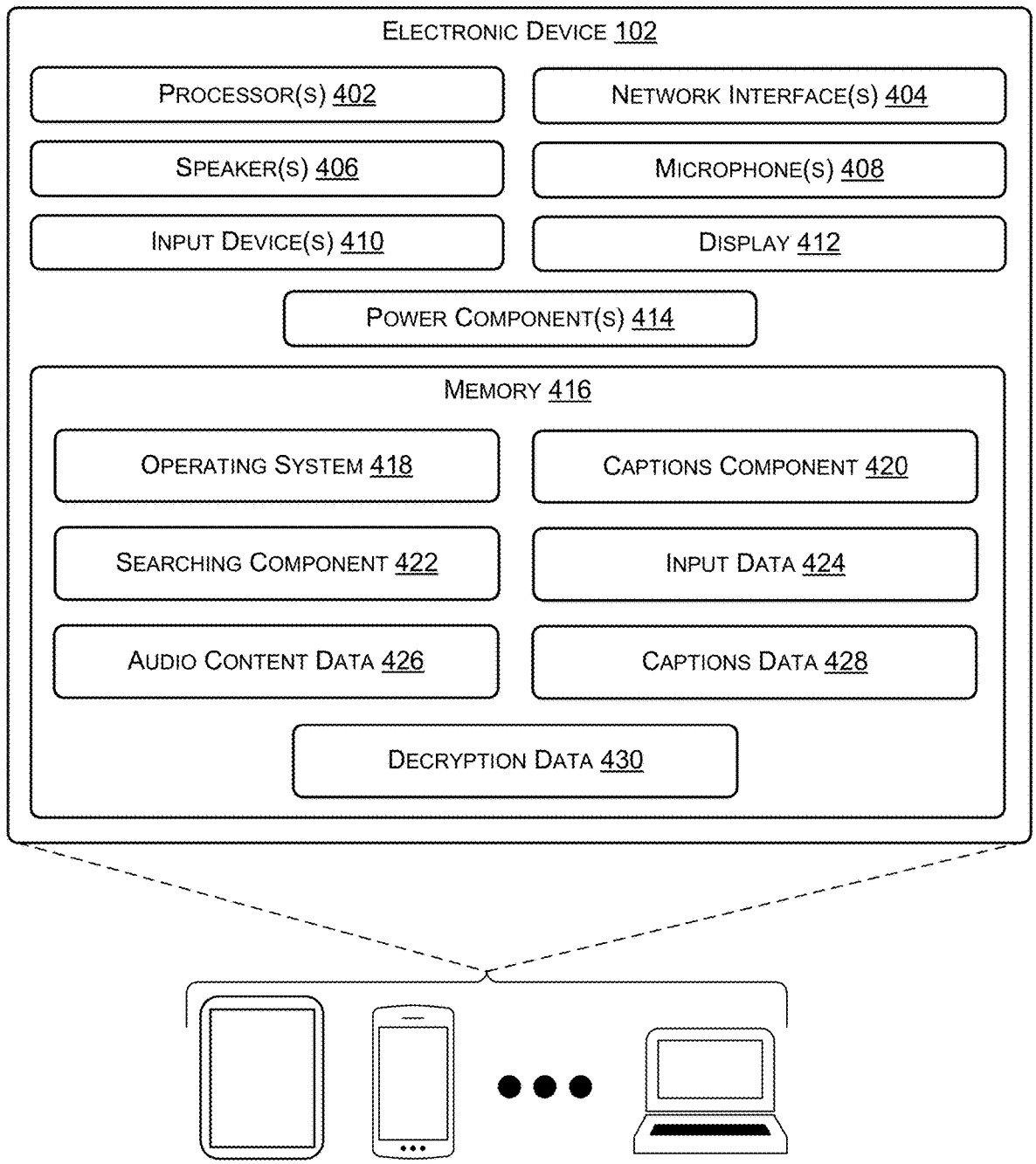
FIG. 4 illustrates a block diagram of an electronic device that provides captions with audio content items, according to various examples of the present disclosure.

FIG. 4 illustrates a block diagram of the electronic device 102 that provides captions with audio content items, according to various aspects of the present disclosure. As shown, the electronic device 102 includes processor(s) 402, network interface(s) 404, speaker(s) 406, microphone(s) 408, input device(s) 410, a display 412, power component(s) 414, and memory 416. In some instances, the electronic device 102 may include one or more additional components not illustrated in the example of FIG. 4. Additionally, or alternatively, in some instances, the electronic device 102 may not include one or more of the components illustrated in the example of FIG. 4.

Although the electronic device 102 is illustrated as having one or more integral speaker(s) 406, in other examples, the electronic device 102 may not include speaker(s) 406. For example, the electronic device 102 may produce an audio output signal that drives an external loudspeaker, such as headphones connected to the electronic device 102. As another example, the electronic device 102 may drive or control an external loudspeaker through a wireless data connection such as a Bluetooth connection. In other situations, the electronic device 102 may be used in conjunction with a loudspeaker device that receives data and other instructions from the remote system(s) 302, rather than from the electronic device 102.

The microphone(s) 408 may include sensors (e.g., transducers) configured to receive sound. The microphone(s) 408 may generate input signals for audio input (e.g., sound). For example, the microphone(s) 408 may determine digital input signals for an utterance of a user. In some instances, the microphone(s) 408 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 2112) to receive sound from four directions. The microphone(s) 408 may be in a planar configuration, or positioned apart in a non-planar three-dimensional region. In some instances, the microphone(s) 408 may include a spatially disparate array of sensors in data communication. For example, a networked array of sensors may be included. The microphone(s) 408 may include omni-directional microphones, directional microphones (e.g., shotgun microphones), and so on.

The input device(s) 410 may include button(s), key(s), joystick(s), touch-sensitive pad(s), trigger(s), sensor(s) that detect movement of the electronic device 102 (e.g., accelerometer(s), magnetometer(s), etc.), and/or any other type of device that is able to receive input from the user. The display 412 may include any type of display that is configured to display content. In some instances, the display 412 includes a touchscreen display that is capable of receiving inputs.

The power component(s) 414 may be configured to provide power to the electronic device 102. For a first example, power component(s) 414 may include one or more batteries. For a second example, the power component(s) 414 may include components connected to a source of external AC (alternating-current) power, such as a household AC power supply (alternatively referred to herein as "AC mains" or "wall power").

The electronic device 102 may include the memory 416. The memory 416 may be used to store any number of software components that are executable by the processor(s) 402. Software components stored in the memory 416 may include an operating system 418 that is configured to manage hardware and services within and coupled to the electronic device 102. In addition, executable components stored by the memory 416 may include a captions component 420 and a searching component 422.

The captions component 420 may be configured to provide captions while the electronic device 102 is outputting audio content. For example, the electronic device 102 may generate input data 424 representing an input received using the input device(s) 410 and/or the display 412. The input data 424 may indicate a selection of an audio content item. Based on the input data 424, the electronic device 102 may send, to the remote system(s) 302, a request for the audio content item and/or the captions associated with the audio content item. The electronic device 102 may then use the techniques described herein to receive, from the remote system(s) 302, audio content data 426 representing the audio content item and captions data 428 representing the captions. In some instances, the electronic device 102 may further receive, from the remote system(s) 302, decryption data 430 for decrypting the audio content data 426 and/or the captions data 428.

In instances where the electronic device 102 receives the decryption data 430, the electronic device 102 may use the decryption data 430 to decrypt the audio content data 426 and/or the captions data 428. In some instances, before performing the decryption, the electronic device 102 may initially have to decrypt the decryption data 430 using additional decryption data that is stored in the memory. For example, the additional decryption data may be associated with the electronic device 102, where the electronic device 102 uses the additional decryption data to securely communicate with the remote system(s) 302. For instance, before sending the decryption data 430, the remote system(s) 302 may have encrypted the decryption data 430 using encryption data that is associated with the additional decryption data, such that the additional decryption data is able to decrypt the encrypted decryption data 430.

The electronic device 102 may then output, using the speaker(s) 406, the audio content item represented by the audio content data 426. While outputting the audio content item, the captions component 420 may be configured to select portions of the captions for display using the display 412, using the techniques described herein. For example, the captions component 420 may determine the maximum number of words (and/or characters) that can be presented by the display 412. The captions component 520 may then use the timestamps represented by the captions data 428 to identify pauses within the audio content item. Using the maximum number of word (and/or characters) and the pauses, the captions component 420 may select portions of the captions. Additionally, the captions component 420 may be configured to display graphical element(s) indicating a current position within the audio content item and/or the captions as the electronic device 102 is outputting the audio content.

In some instances, the captions component 420 displays the captions based on one or more inputs received from the user. For example, the electronic device 102 may generate input data 424 indicating a size of the font, a type of the font, a color of the font, a type of graphical element to use to indicate a current position within the audio content item, a background for the captions, a language for the captions, and/or the like. The captions component 420 may then use the input data 424 to display the captions according to the user's selection(s).

The searching component 422 may be configured to retrieve additional information about the audio content item. For instance, while displaying a portion of the captions, the electronic device 102 may generate input data 424 representing a selection of a word included in the portion of the captions. The searching component 422 may then identify additional information related to the selected word. In some instances, the additional information is represented by the audio content data 426 and/or the captions data 428. In other instances, the searching component 422 may use one or more network resources, such as the Internet, to retrieve the additional information related to the selected word. In either instance, the searching component 422 may cause the electronic device 102 to display the additional information using the display 412.

FIGS. 5-13 illustrate various processes for providing captions with audio content. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 5:
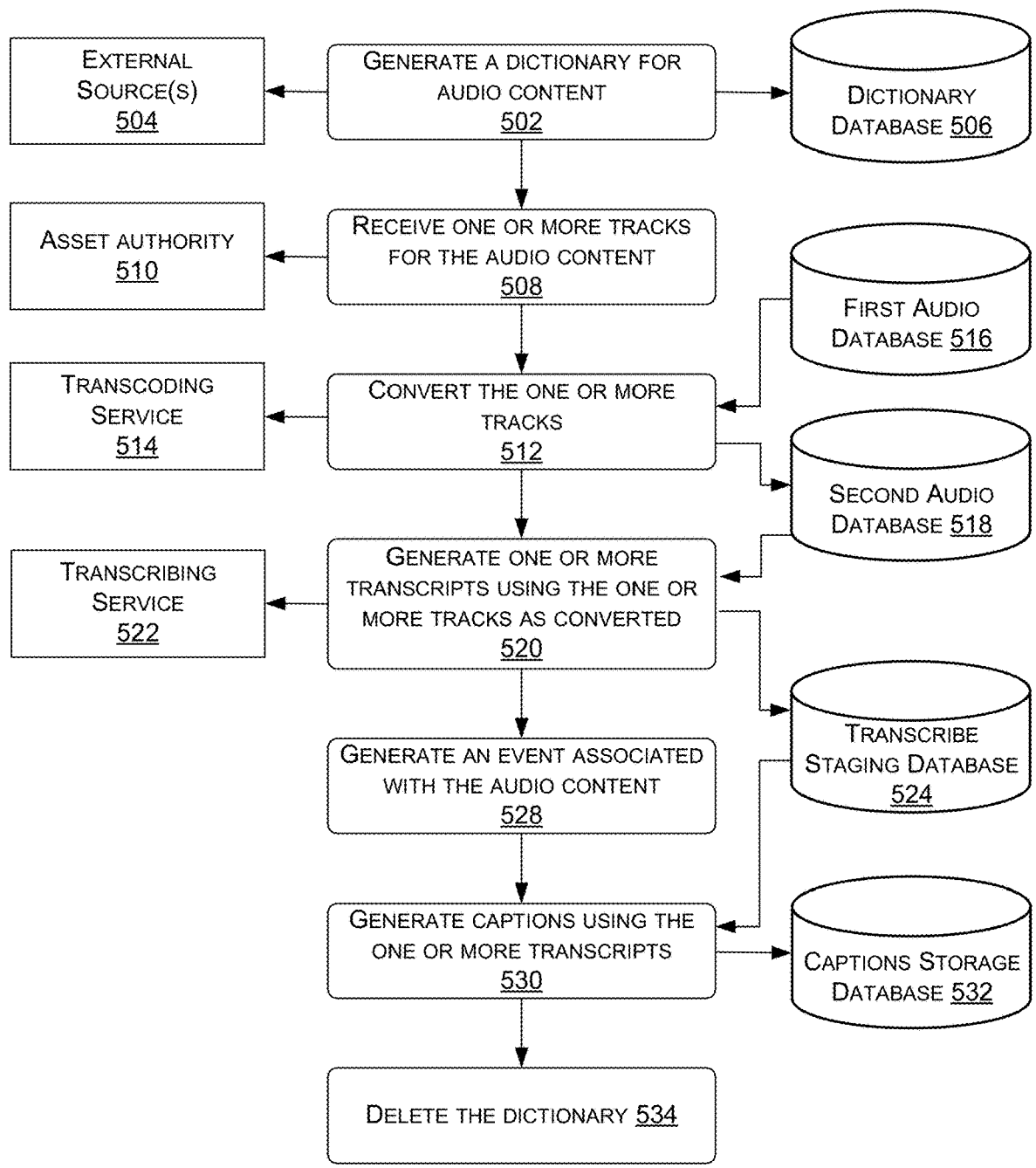
FIG. 5 illustrates an example process for generating captions for audio content items, according to various examples of the present disclosure.

FIG. 5 illustrates an example process 500 for generating captions for audio content items, according to various examples of the present disclosure. At 502, the process 500 may include generating a dictionary for audio content. For instance, the remote system(s) 302 may generate the dictionary for the audio content. In some instances, the remote system(s) 302 generate the dictionary using one or more external source(s) 504. In some instances, after generating the dictionary, the remote system(s) 302 may store data representing the dictionary in a dictionary database 506 (which may be stored by the remote system(s) 302). When storing the data in the dictionary database 506, the remote system(s) may index the dictionary using identifier(s) associated with the audio content.

At 504, the process 500 may include receiving one or more tracks for the audio content. For instance, the remote system(s) 302 may receive the one or more tracks. A track may include a portion of the audio content. For example, if the audio content includes an audiobook, a track may include a word, sentence, paragraph, page, chapter, and/or the like of the audiobook. In some instances, the remote system(s) 302 communicate with an asset authority 510 to retrieve the one or more tracks. For example, the asset authority 510 may store a database that includes data representing the one or more tracks.

At 512, the process 500 may include converting the one or more tracks. For instance, the remote system(s) 302 may convert the one or more tracks. In some instances, to convert a track, the remote system(s) 302 may use a transcoding service 514. In some instances, to convert a track, the remote system(s) 302 may receive the track in a first format from a first audio database 516. The remote system(s) 302 may then convert the track from the first format to a second format. After converting, the remote system(s) 302 may store data representing the converted tracks in a second audio database 518. In some instances, the first format includes Advance Audio Coding (AAC) and the second format includes Waveform Audio File Format (WAV). However, this is just one example of the formats and, in other examples, the first format and/or the second format may include any other format.

At 520, the process 500 may include generating one or more transcripts using the one or more tracks as converted. For instance, the remote system(s) 302 may generate the one or more transcripts by transcribing the one or more tracks. Transcribing a track may include generating a plain text file representing the track, generating binary code representing the text, and/or generating a score for the transcription. In some instances, the remote system(s) 302 transcribe the one or more tracks using a transcribing service 522. In some instances, the remote system(s) 302 transcribe the one or more tracks in parallel. Still, in some instances, after transcribing the one or more tracks, the remote system(s) 302 store data representing the transcription(s) for the one or more tracks in a transcribe staging database 524.

At 528, the process 500 may include generating an event associated with the audio content. For instance, the remote system(s) 302 may generate the event associated with the audio content. In some instances, the event may indicate a completion of transcribing the one or more tracks. In some instances, the event may indicate that the captions are being generated for the audio content.

At 530, the process 500 may include generating captions using the one or more transcripts. For instance, the remote system(s) 302 may use the one or more transcripts to generate the captions for the audio content. In some instances, to generate the captions, the remote system(s) 302 may convert the one or more transcripts to a specific format. For instance, the remote system(s) 302 may generate, for various portions (e.g., words, sentences, paragraphs, pages, chapters) of the one or more transcripts, a first timestamp indicating a start of the portion, a second timestamp indicating an end of the portion, text included in the portion, the score associated with the portion, and/or the like. The remote system(s) may then generate the captions using the first timestamps, the second timestamps, the text, the scores, and/or the like for the portions. The remote system(s) may then store data representing the captions in a captions storage database 532 (which may include, and/or represent, the captions storage database 226 and/or the content delivery database 236).

At 534, the process 500 may include deleting the dictionary. For instance, the remote system(s) 302 may delete the dictionary. In some instances, to delete the dictionary, the remote system(s) 302 may cause the data representing the dictionary to be removed from the dictionary database 506. In some instances, the workflow component 208 may then receive data indicating that the captions have been generated.

Figure 6:
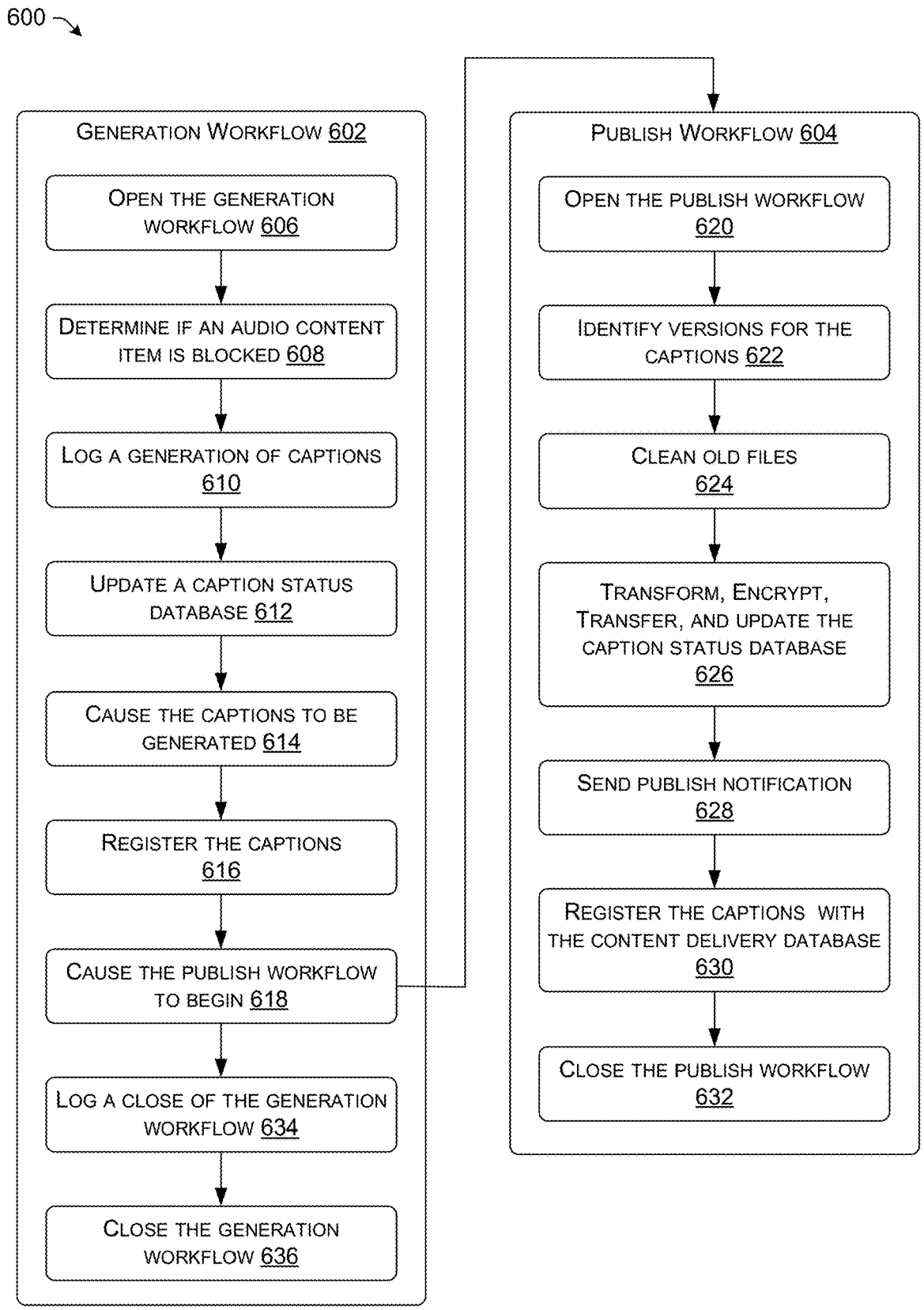
FIG. 6 illustrates an example process for publishing captions for audio content items, according to various examples of the present disclosure.

FIG. 6 illustrates an example process 600 for publishing captions for audio content items, according to various examples of the present disclosure. As shown, the process 600 includes a generation workflow 602 and a publish workflow 604. Although the example process 600 of FIG. 6 illustrates using the generation workflow 602 and the separate publish workflow 604, in other examples, the generation workflow 602 and the publish workflow 604 may be combined into a single workflow. Additionally, in some examples, the generation workflow 602 and/or the publish workflow 604 may be separated into one or more workflows.

At 606, the process 600 may include opening the generation workflow. For instance, the remote system(s) 302 may open the generation workflow 602. In some instances, the remote system(s) 302 may then determine a status of an audio content item. The status may indicate if captions for the audio content item are available, not available, being generated, expired, and/or the like.

At 608, the process 600 may include determining if an audio content item is blocked. For instance, the remote system(s) 302 may determine if the audio content item is blocked. In some instances, the audio content item may be blocked based on a publisher opting out of the service. In some instances, the audio content item may be blocked based on feedback (e.g., complaints) received from users. In either instance, if the remote system(s) 302 determine that the audio content item is blocked, then the remote system(s) 302 may not generate captions for the audio content item.

At 610, the process 600 may include logging a generation of captions and at 612, the process 600 may include updating a caption status database. For instance, the remote system(s) 302 may log that the captions are being generated for the audio content item. Additionally, the remote system(s) 302 may update the caption status database (e.g., the caption status database 232) to indicate that the captions are being generated. This may indicate to users and/or other devices that the captions are being generated.

At 614, the process 600 may include causing the captions to be generated. For instance, the remote system(s) 302 may cause the captions to be generated, such as by using the example process 500 of FIG. 5. In some instances, to cause the captions to be generated, the remote system(s) 302 may send, to a device, data representing identifier(s) of the audio content item and/or data representing the audio content item. In some instances, the remote system(s) 302 may then receive a notification that the generation process is complete.

At 616, the process 600 may include registering the captions. For instance, the remote system(s) 302 may register the captions. In some instances, to register the captions, the remote system(s) 302 update the status of the captions to indicate that the captions are available and/or complete. In some instances, to register the captions, the remote system(s) 302 may store data representing the captions in one or more databases, such as the content delivery database 236.

At 618, the process 600 may include causing the publish workflow to begin. For instance, the remote system(s) 302 may cause the publish workflow 604 to begin. As such, at 620, the process 600 may include opening the publish workflow.

At 622, the process 600 may include identifying versions of the captions. For instance, the remote system(s) 302 may identify other versions of the captions that should be generated. At 624, the process 600 may include cleaning old files. For instance, the remote system(s) 302 may clean the old files.

At 626, the process 600 may include transforming, encrypting, transferring, and updating the caption status database. For instance, the remote system(s) 302 may take the transcripts for the captions and generate data that the electronic device 102 may process (which is described with respect to the example process 500 of FIG. 5). The remote system(s) 302 may then encrypt the data and store the data in one or more databases. Additionally, the remote system(s) 302 may send updates indicating that the captions are available.

At 628, the process 600 may include sending a publish notification and at 630, the process 600 may include registering the captions with the content delivery database. For instance, the remote system(s) 302 may send notification(s) to user(s) indicating that the captions have been published. The remote system(s) 302 may then register the captions with the content delivery database 236. For instance, the remote system(s) 302 may store the data representing the captions within the content delivery database 236.

At 632, the process 600 closes the publish workflow. For instance, the remote system(s) 302 may close the publish workflow 604. Additionally, at 634, the process 600 may include logging a close of the generation workflow and at 636, the process 600 may include closing the generation workflow. For instance, the remote system(s) 302 may close the generation workflow 602.

Figure 7A:
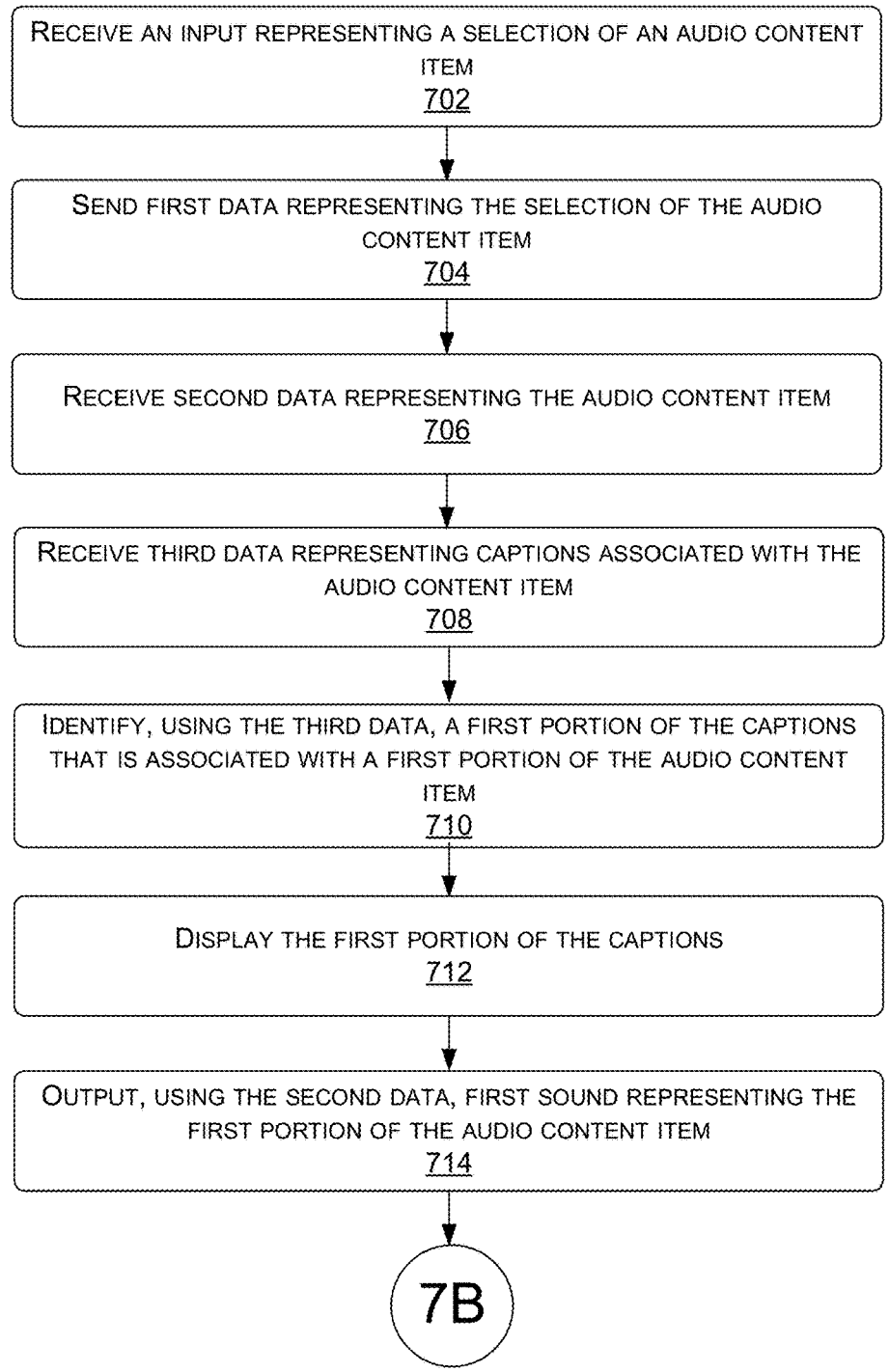

FIGS. 7A-7B illustrate an example process 700 for providing captions with audio content, according to various examples of the present disclosure. At 702, the process 700 may include receiving an input representing a selection of an audio content item. For instance, the electronic device 702 may receive the input representing the selection of the audio content item. In some instances, before receiving the input, the electronic device may display a list of audio content items. In such instances, the list may indicate which audio content items are associated with captions and which audio content items are not associated with captions. The input may then include a selection of one of the audio content items that is associated with captions.

At 704, the process 700 may include sending first data representing the selection of the audio content item. For instance, the electronic device 102 may send, to the remote system(s) 302, the first data representing the selection of the audio content item. In some instances, the first data may represent identifier(s) associated with the audio content item. In some instances, the first data may further represent a request for the captions associated with the audio content item.

At 706, the process 700 may include receiving second data representing the audio content item. For instance, the electronic device 102 may receive, from the remote system(s) 302, the second data representing the audio content item.

At 708, the process 700 may include receiving third data representing captions associated with the audio content item. For instance, the electronic device 102 may receive, from the remote system(s) 302, the third data representing the captions. In some instances, before receiving the third data, the electronic device 102 may receive data representing an address for retrieving the captions and/or decryption data for decrypting the third data. In such instances, the electronic device 102 may then use the address to retrieve the third data. Additionally, the electronic device 102 may then use the decryption data to decrypt the third data.

Still, in some instances, the second data representing the audio content item and the third data representing the captions may be included in a single data file. In such instances, the electronic device 102 may receive the data file from the remote system(s) 302.

At 710, the process 700 may include identifying, using the third data, a first portion of the captions that is associated with a first portion of the audio content item. For instance, the electronic device 102 may identify the first portion of the captions. In some instances, to identify the first portion of the captions, the electronic device 102 may determine a maximum number of words (and/or characters) to display. The electronic device 102 may further use timestamps to identify pauses within the audio content item that satisfy a threshold time. Using the maximum number of words and/or the pauses, the electronic device 102 may identify the first portion of the captions such that the first portion starts at a beginning position of the audio content item and ends a first pause.

At 712, the process 700 may include displaying the first portion of the captions. For instance, the electronic device 102 may display the first portion of the captions. In some instances, the electronic device 102 may allow the user to select at least the size of the font, the type of font, and/or the like associated with the captions. In such instances, the electronic device 102 may display the first portion of the captions using the selected size of the font and/or the selected type of font.

At 714, the process 700 may include outputting, using the second data, first sound representing the first portion of the audio content item. For instance, while displaying the first portion of the captions, the electronic device 102 may use the second data to output the first sound. In some instances, before outputting the first sound, the electronic device 102 may receive an input indicating a speed for outputting the audio content item. In such instances, the electronic device 102 may then output the first portion of the audio content item according to the speed. In some instances, while outputting the first sound, the electronic device 102 may display graphical elements that indicate the current position within the audio content item that is being output by the electronic device 102.

At 716, the process 700 may include identifying, using the third data, a second portion of the captions that is associated with a second portion of the audio content item. For instance, the electronic device 102 may identify the second portion of the captions. In some instances, to identify the second portion of the captions, the electronic device 102 may use the maximum number of words (and/or characters). The electronic device 102 may further use the timestamps to identify pauses within the audio content item that satisfy a threshold pause. Using the maximum number of words and/or the pauses, the electronic device 102 may identify the second portion of the captions such that the second portion starts after the first pause and ends before a second pause. In other words, the second portion of the captions may include text that occurs right after the first portion of the captions.

At 718, the process 700 may include displaying the second portion of the captions. For instance, the electronic device 102 may display the second portion of the captions. In some instances, before displaying the second portion of the captions, the electronic device 102 ceases from displaying the first portion of the captions, such as during the first pause. The electronic device 102 then begins to display, during the first pause, the second portion of the captions. As such, the electronic device 102 may display the second portion of the captions before outputting the second portion of the audio content item that corresponds to the second portion of the captions.

At 720, the process 700 may include outputting, using the second data, second sound representing the second portion of the audio content item. For instance, while displaying the second portion of the captions, the electronic device 102 may use the second data to output the second sound. In some instances, the electronic device 102 may output the second portion of the audio content item according to the speed. In some instances, while outputting the second sound, the electronic device 102 may display graphical elements that indicate the current position within the audio content item that is being output by the electronic device 102.

Figure 8:
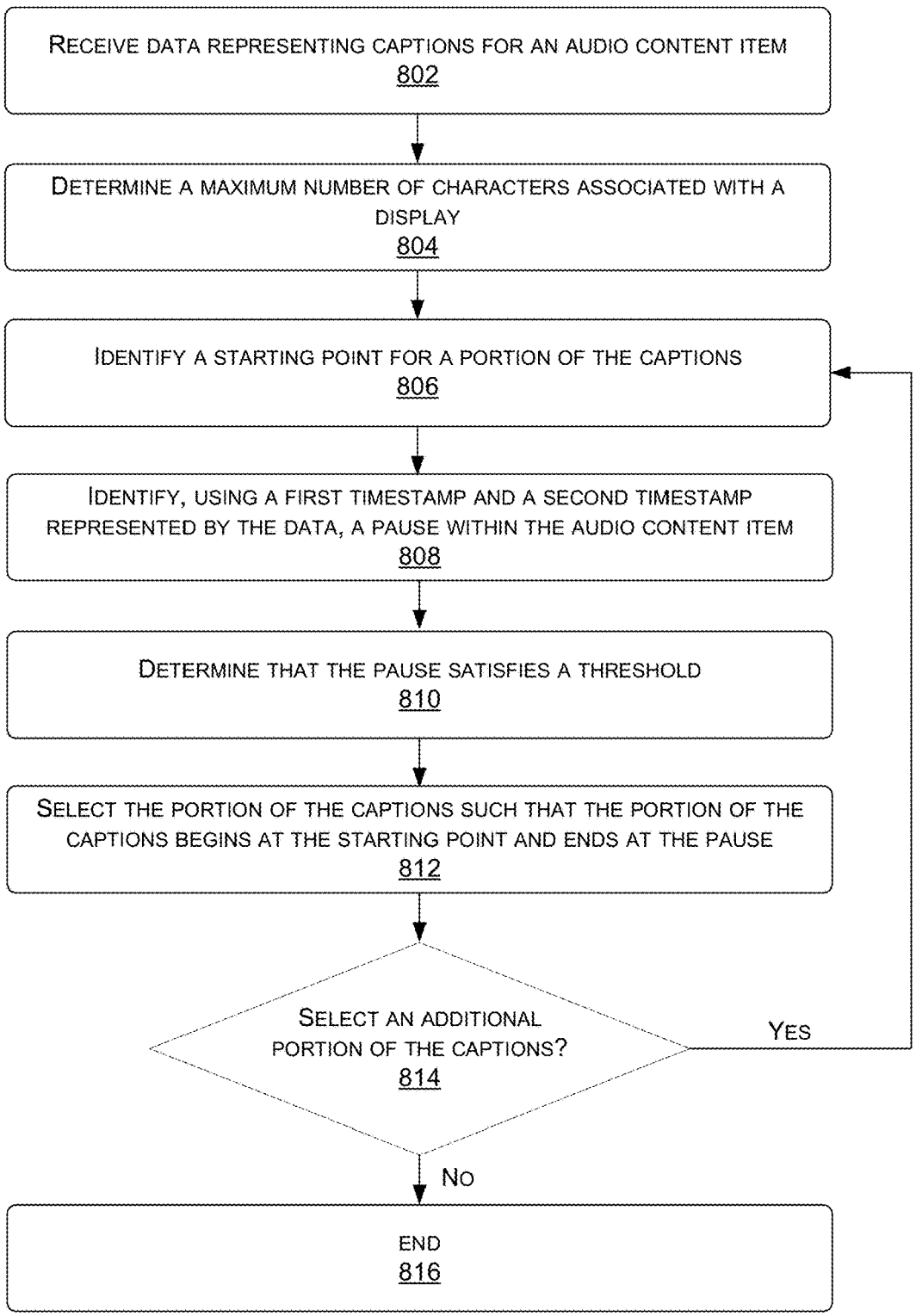
FIG. 8 illustrates an example process for selecting a portion of captions, according to various examples of the present disclosure.

FIG. 8 illustrates an example process 800 for selecting a portion of captions associated with an audio content item, according to various examples of the present disclosure. At 802, the process 800 may include receiving data representing captions for an audio content item. For instance, the electronic device 102 may receive, from the remote system(s) 302, the data representing the captions.

At 804, the process 800 may include determining a maximum number of characters associated with a display. For instance, the electronic device 102 may determine the maximum number of characters (and/or the maximum number of words) that the electronic device 102 may display using the display 412. In some instances, the electronic device 102 makes the determination using one or more factors. The one or more factors may include, but are not limited to, a size of the display 412, an orientation of the display 412, a size of the font (which may be selected by the user), a type of font (which may be selected by the user), input data from the user that indicates the maximum number of characters, and/or the like.

At 806, the process 800 may include identifying a starting point for a portion of the captions. For instance, the electronic device 102 may identify the starting point. In some instances, such as when the electronic device 102 has yet to display the captions, the electronic device 102 may identify the starting point for the portion of the captions as the beginning of the audio content item, the beginning of a sentence, the beginning of a paragraph, the beginning of a chapter, and/or the like. For instance, the electronic device 102 may receive an input from the user that indicates the starting point within the audio content item. The electronic device may then analyze timestamps represented by the data to identify a timestamp that corresponds to (e.g., matches) the starting point within the audio content item. Using the timestamp, the electronic device 102 may determine that the portion is to start at the character (and/or word) that is associated with the timestamp.

In other instances, such as when the electronic device 102 is already displaying an additional portion of the captions, the electronic device 102 may identify the starting point for the portion of the captions based on an ending point of the additional portion of the captions. For instance, the electronic device 102 may identify the starting point as the next character (and/or word) after the end of the additional portion of the captions.

At 808, the process 800 may include identifying, using a first timestamp and a second timestamp represented by the data, a pause within the audio content item. For instance, the electronic device may analyze timestamps represented by the data. Based on the analysis, the electronic device 102 may use the first timestamp, which indicates the end of a first word, and the second timestamp, which indicates the start of a second word, to identify the time period between the first word and the second word, where the time period corresponds to a pause.

In some instances, the electronic device 102 uses the maximum number of characters when identifying the pause. For example, when analyzing the timestamps, the electronic device 102 may analyze timestamps that are associated with words that are within the maximum number of characters to the starting point for the portion of the captions. The electronic device 102 may then identify one or more pauses that within the maximum number of characters to the starting point.

At 810, the process 800 may include determining that the pause satisfies a threshold. For instance, the electronic device 102 may determine that the time period satisfies a threshold time. The threshold time may include, but is not limited to, ten milliseconds, fifty milliseconds, one second, and/or any other threshold. In some instances, based on the determination, the electronic device 102 may determine that the pause likely indicates an end of a sentence, paragraph, chapter, and/or the like within the audio content.

In some instances, such as when the electronic device 102 identifies multiple pauses, the electronic device 102 may identify two or more pauses that satisfy the threshold. The electronic device 102 may then select the pause from the two or more pauses. For a first example, the electronic device 102 may select the longest pause from the two or more pauses. For a second example, the electronic device 102 may select the pause as the pause that occurs furthest from the starting point for the captions, but is still within the maximum number of characters. Still, for a third example, the electronic device 102 may select the pause that includes the longer time period.

At 812, the process 800 may include selecting the portion of the captions such that the portion of the captions begins at the starting point and ends at the pause. For instance, the electronic device 102 may use the starting point and the pause to select the portion of the captions. The portion of the captions may begin at the starting point and end that the word (and/or character) that is right before the pause.

At 814, the process 800 may include determining whether to select another portion of the captions. For instance, the electronic device 102 may determine whether to select the additional portion of the captions. In some instances, the electronic device 102 may determine to select the additional portion of the captions when the electronic device 102 continues to output the audio content item, when the electronic device 102 determines that the portion of the captions does not include a last portion of the captions, and/or the like. In some instances, the electronic device 102 may determine not to select the additional portion of the captions when the electronic device 102 ceases outputting the audio content item, when the electronic device 102 determines that the portion of the captions includes a last portion of the captions, when the electronic device 102 receives an input associated with ceasing displaying the captions and/or outputting the audio content item, and/or the like.

If it is determined to select the additional portion of the captions, then the process 800 may repeat starting back at 806. However, if it is determined not to select the additional portion of the captions, then at 816, the process 800 may end. For instance, the electronic device 102 may cease presenting the captions. Additionally, the electronic device 102 may case from outputting the audio content.

FIG. 9 illustrates an example process 900 for generating captions for an audio content item, according to various examples of the present disclosure. At 902, the process 900 may include storing first data representing a user profile, the user profile being associated with a first audio content item and a second audio content item. For instance, the remote system(s) 302 may store the first data representing the user profile. The user profile may be associated with a library of audio content items, where the library includes at least the first audio content item and the second audio content item.

At 904, the process 900 may include receiving second data representing a request to provide captions. For instance, the remote system(s) 302 may receive, from the electronic device 102, the second data. In some instances, the second data represents a request to opt in to a service provided by the remote system(s) 302, where the service is associated with generating and/or providing captions for audio content items. In some instances, based on receiving the second data, the remote system(s) 302 may update the user profile to indicate that the user profile has opted in to the service.

At 906, the process 900 may include determining that the first audio content item is associated with first captions. For instance, based on receiving the second data, the remote system(s) 302 may analyze the library of audio content items associated with the user profile to determine if the audio content items are associated with captions (e.g., captions are available, etc.) or not associated with captions (e.g., captions are not available, being generated, expired, etc.). Based on analyzing the library, the electronic device 102 may determine that the first audio content item is associated with the first captions. In some instances, the electronic device 102 makes the determination based on determining that the first captions are available for the first audio content item.

At 908, the process 900 may include sending third data indicating that the first audio content item is associated with the first captions. For instance, the remote system(s) 302 may send, to the electronic device 102, the third data indicating that the first audio content item is associated with the first captions. In some instances, the remote system(s) 302 may update the user profile to indicate that the first audio content item is associated with the first captions.

At 910, the process 900 may include determining that the second audio content item is not associated with the second captions. For instance, based on the analyzing of the library of audio content items, the remote system(s) 302 may determine that the second audio content item is not associated with the second captions. In some instances, the electronic device 102 makes the determination based on determining that the second captions are not available for the second audio content item.

At 912, the process 900 may include causing the second captions associated with the second audio content item to be generated. For instance, the remote system(s) 302 may cause the second captions associated with the second audio content item to be generated.

At 914, the process 900 may include determining that the second captions have been generated for the second audio content item. For instance, the remote system(s) 302 may determine that the second captions have been generated. In some instances, after the determination, the remote system(s) 302 may store data representing the second captions.

At 916, the process 900 may include causing one or more databases to be updated to indicate that the second captions are available for the second audio content item. For instance, the remote system(s) 302 may update the one or more databases to indicate the status of the second captions. The remote system(s) 302 may update the status to indicate that the second captions are available for the second audio content item.

At 918, the process 900 may include sending fourth data indicating that the second audio content item is associated with the second captions. For instance, the remote system(s) 302 may send, to the electronic device 102, the fourth data indicating that the second audio content item is associated with the second captions. In some instances, the remote system(s) 302 may update the user profile to indicate that the second audio content item is associated with the second captions.

Figure 10:
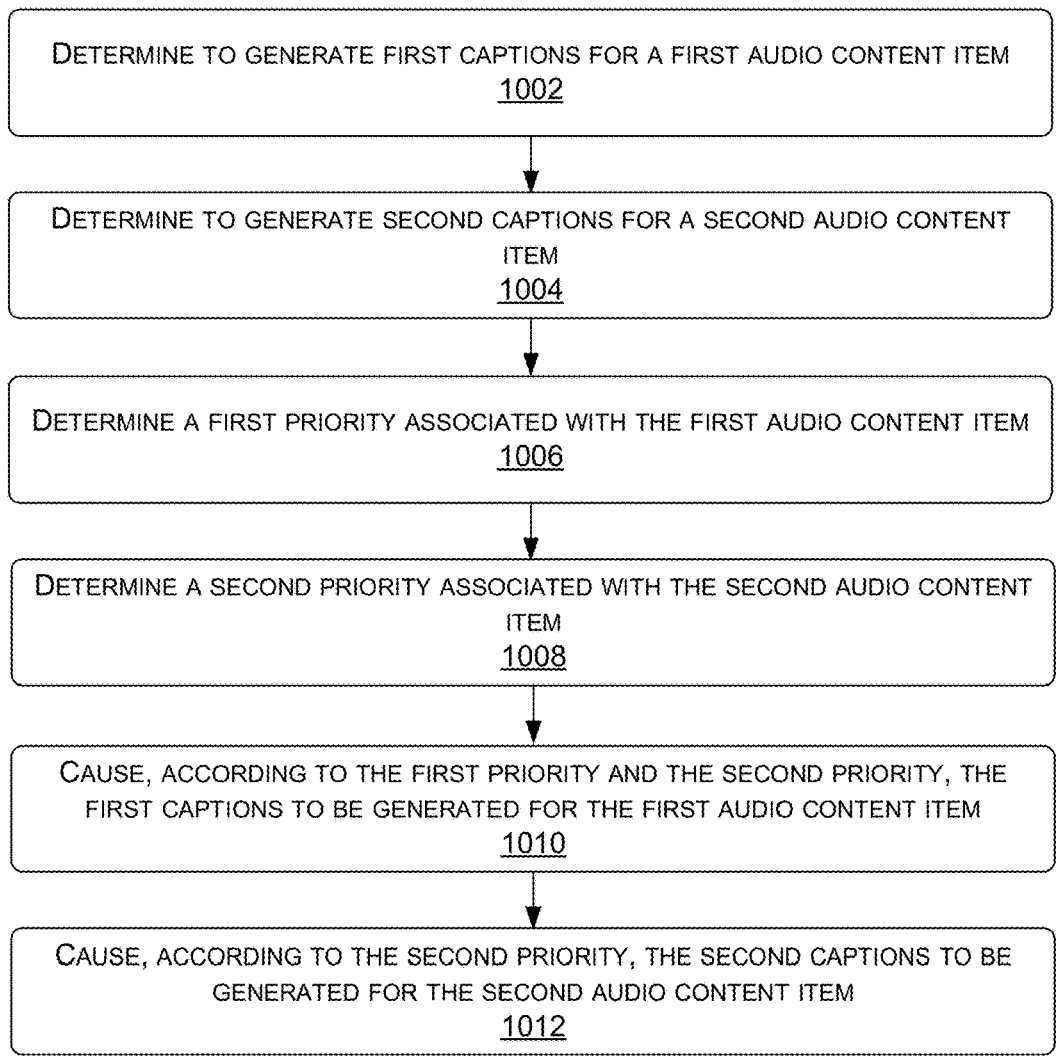
FIG. 10 illustrates an example process for prioritizing audio content items when generating captions, according to various examples of the present disclosure.

FIG. 10 illustrates an example process 1000 for prioritizing audio content items when generating captions, according to various examples of the present disclosure. At 1002, the process 1000 may include determining to generate first captions for a first audio content item. For instance, the remote system(s) 302 may determine to generate the first captions for the first audio content item. In some instances, the remote system(s) 302 may make the determination based on a user opting in to a service, where the first audio content item is included in a library associated with a user profile of the user. In some instances, the remote system(s) 302 may make the determination based on determining that the first audio content item includes a new version of another audio content item. In some instances, the remote system(s) 302 may make the determination based on determining that the user acquired the first audio content item. Still, in some instances, the remote system(s) 302 may make the determination based on previous captions for the first audio content item expiring.

At 1004, the process 1000 may include determining to generate second captions for a second audio content item. For instance, the remote system(s) 302 may determine to generate the second captions for the second audio content item. In some instances, the remote system(s) 302 may make the determination based on the user opting in to the service, where the second audio content item is included in the library associated with the user profile. In some instances, the remote system(s) 302 may make the determination based on determining that the second audio content item includes a new version of another audio content item. In some instances, the remote system(s) 302 may make the determination based on determining that the user acquired the second audio content item. Still, in some instances, the remote system(s) 302 may make the determination based on previous captions for the second audio content item expiring.

At 1006, the process 1000 may include determining a first priority associated with the first audio content item and at 1008, the process 1000 may include determining a second priority associated with the second audio content item. For instance, the remote system(s) 302 may determine the first priority and the second priority. In some instances, the remote system(s) 302 may use one or more factors to make the determinations. The one or more factors may include, but are not limited to, a time at which the first audio content item was last accessed, a time at which the second audio content item was last accessed, a number of times that the first audio content has been accessed, a number of times that the second audio content item has been accessed, a request to generate the first captions, a request to generate the second captions, and/or the like.

At 1010, the process 1000 may include causing, using the first priority and the second priority, the first captions to be generated for the first audio content item. For instance, the remote system(s) 302 may determine that the first priority is greater than the second priority. Based on the determination, the remote system(s) 302 may cause the first captions to be generated for the first audio content item before causing the second captions to be generated for the second audio content item. In some instances, after the first captions are generated, the remote system(s) 302 may update a status associated with the first audio content item to indicate that the first captions are available for the first audio content item.

At 1012, the process 1000 may include causing, according to the second priority, the second captions to be generated for the second audio content item. For instance, after causing the first captions to be generated, the remote system(s) 302 may cause the second captions to be generated for the second audio content item. In some instances, the remote system(s) 302 may then update a status associated with the second audio content item to indicate that the second captions are available for the second audio content item.

Figure 11:
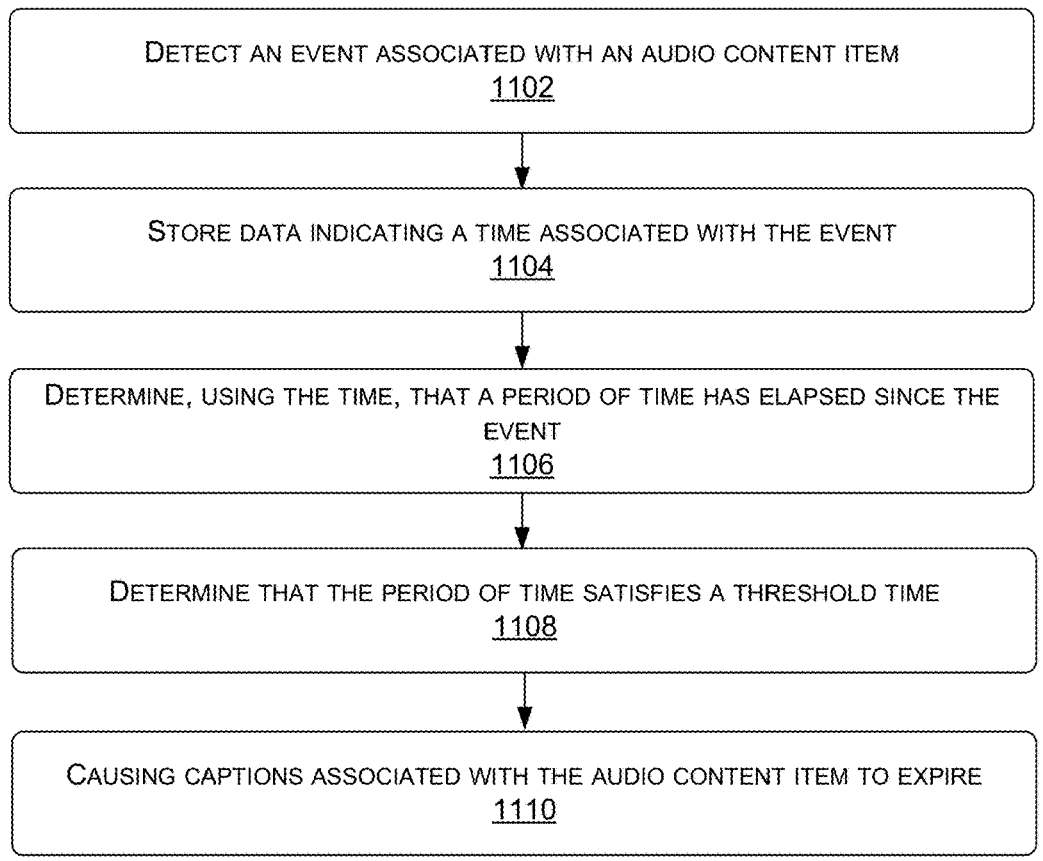
FIG. 11 illustrates an example process for expiring captions associated with an audio content item, according to various examples of the present disclosure.

FIG. 11 illustrates an example process 1100 for expiring captions associated with an audio content item, according to various examples of the present disclosure. At 1102, the process 1100 may include detecting an event associated with an audio content item. For instance, the remote system(s) 302 may detect the event. The event may include a user requesting the audio content item, a user requesting captions associated with the audio content item, a user outputting the audio content item, a user displaying the captions, a user acquiring the audio content item, the captions being generated for the audio content item, a user that has previously acquired the audio content item opting in to the service, and/or the like.

At 1104, the process 1100 may include storing data indicating a time associated with the event. For instance, the remote system(s) 302 may store the data indicating the time associated with the event. In some instances, the remote system(s) 302 may then detect one or new events associated with the audio content item. When the remote system(s) 302 detect a new event, the remote system(s) 302 may update the data to indicate a new time associated with the new event and/or store new data indicating the new time associated with the new event. In other words, the remote system(s) 302 may monitor the audio content item to determine when the last event associated with the audio content item occurred.

At 1106, the process 1100 may include determining whether another event is detected. For instance, the remote system(s) 302 may determining whether another event is detected. If at 1106 it is determined that another event is detected, then the process 1100 may repeat back at 1104. For instance, if the remote system(s) 302 detect another event, then the remote system(s) 302 may store new data indicating a new time associated with the additional event.

However, if another event is not detected, then at 1108, the process 1100 may include determining, using the time, that a period of time has elapsed since the event. For instance, the remote system(s) 302 may analyze the data representing the time to determine the period of time that has elapsed since the occurrence of the event. If the remote system(s) 302 detected additional events, then the remote system(s) 302 may analyze the time to determine a period of time since a last event occurred with the audio content item.

At 1110, the process 1100 may include determining that the period of time satisfies a threshold time. For instance, the remote system(s) 302 may determine that the period of time satisfies the threshold time. The threshold period of time may include, but is not limited to, one day, fifth days, ninety days, one hundred days, and/or any other time period. In some instances, the remote system(s) 302 make the determination by comparing the period of time to the threshold time. Based on the comparing, the remote system(s) 302 may determine that period of time is equal to or greater than the threshold time.

At 1112, the process 1100 may include causing captions associated with the audio content item to expire. For instance, based on determining that the period of time satisfies the threshold time, the remote system(s) 302 may determine that the captions associated with the audio content item have expired. In some instances, the remote system(s) 302 may then cause data representing the captions to be removed from one or more databases. In some instances, the remote system(s) 302 may update a status associated with the audio content item to indicate that the captions are not available for the audio content item and/or the captions are expired.

Figure 12:
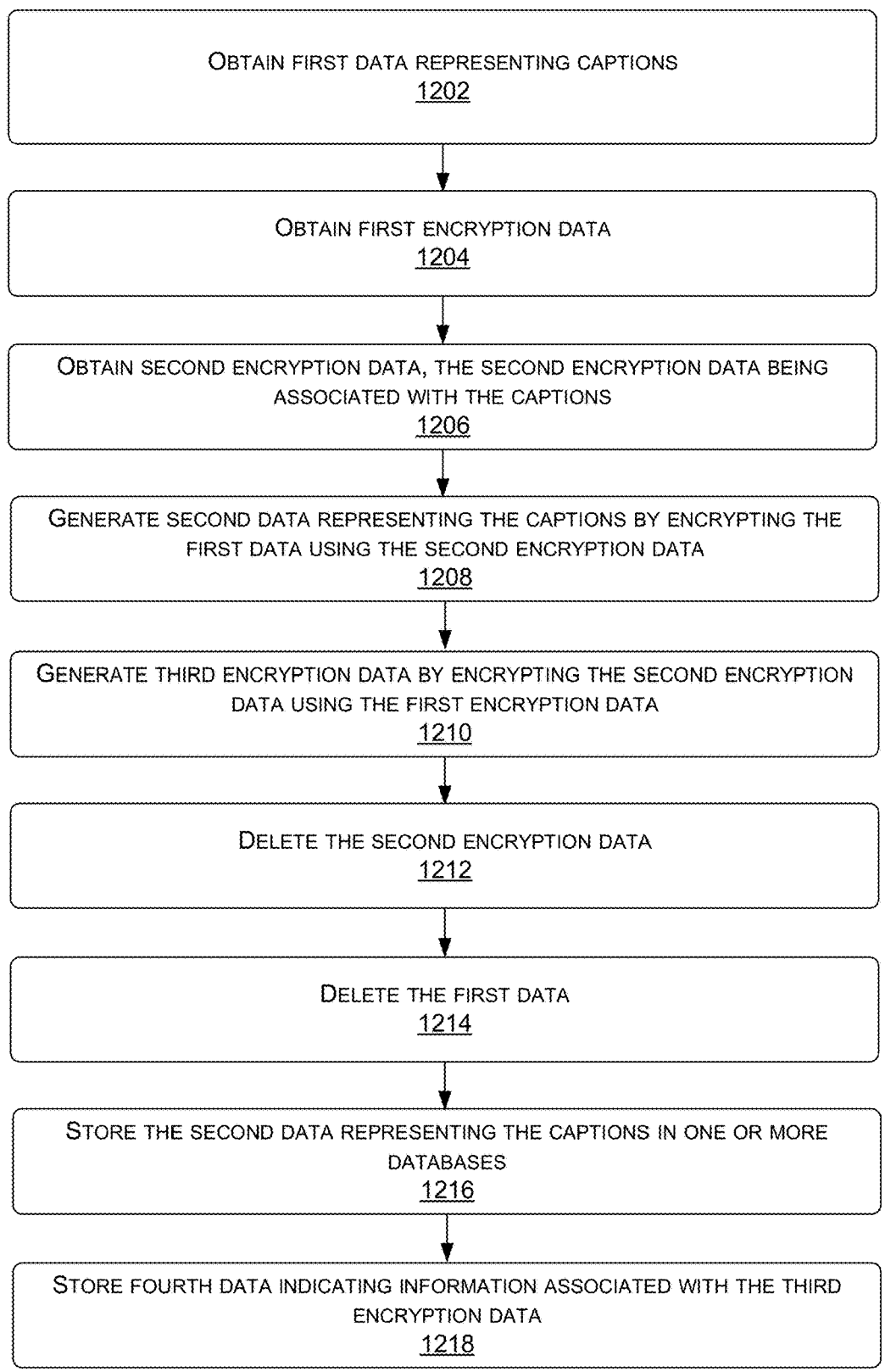
FIG. 12 illustrates an example process for encrypting data that represents captions, according to various examples of the present disclosure.

FIG. 12 illustrates an example process 1200 for encrypting data that represents captions, according to various examples of the present disclosure. At 1202, the process 1200 may include obtaining first data representing captions. For instance, the remote system(s) 302 may obtain the first data representing the captions. In some instances, the remote system(s) 302 obtain the first data after the captions are generated for an audio content item.

At 1204, the process 1200 may include selecting at least an account. For instance, the remote system(s) 302 may collect an account associated with encryption data. The encryption data may include an encryption key. In some instances, the remote system(s) 302 may collect multiple accounts associated multiple encryption keys. For instance, an individual encryption key may be associated with a region, a city, a state, and/or the like. In other instances, the remote system(s) 302 may store the encryption data associated with the accounts.

At 1206, the process 1200 may include generating first encryption data using the account. For instance, the remote system(s) 302 may generate the first encryption data. In some instances, to generate the first encryption data, the remote system(s) 302 may request the account to generate the first encryption data and, in response, receive the first encryption data. In such instances, the account may be associated with a separate remote system. In some instances, the separate remote system may store accounts for a specific geographic area, such as a specific region. In some instances, the remote system(s) 302 perform similar processes for one or more other accounts.

At 1208, the process 1200 may include generating second data representing the captions by encrypting the first data using the first encryption data. For instance, the remote system(s) 302 may generate the second data representing the captions by encrypting the first data using the first encryption data.

At 1210, the process 1200 may include causing second encryption data to be generated using the first encryption data. For instance, the remote system(s) 302 may cause the second encryption data to be generated. In some instances, to cause the second encryption data to be generated, the remote system(s) 302 may send, to a separate remote system) the first encryption data and data representing the account. The remote system(s) 302 then receive, from the separate remote system, the second encryption data. In some instances, the remote system(S) 302 perform similar processes for one or more other accounts. However, in other instances, the remote system(s) 302 may generate the second encryption data by encrypting the first encryption data locally.

At 1212, the process 1200 may include deleting the second encryption data and at 1214, the process 1200 may include deleting the first data. For instance, after generating the third encryption data, the remote system(s) 302 may delete the second encryption data. Additionally, the remote system(s) 302 may delete the first data representing the captions.

At 1216, the process 1200 may include storing the second data representing the captions in one or more databases and at 1218, the process 1200 may include storing fourth data indicating information associated with the third encryption data. For instance, the remote system(s) 302 may store the second data in the one or more databases, such as the content delivery database 236. The remote system(s) 302 may also store the fourth data, such as in the captions status database 232. The information may indicate location(s) for receiving the third encryption data and/or the second data.

In some instances, the remote system(s) 302 may perform similar processes 1200 to encrypt the first data representing the captions for one or more additional accounts. In such instances, the encryption data associated with the accounts and/or the first encryption data may be unique to the respective account. In some instances, the remote system(s) 302 may rotate the encryption data that is used to encrypt the captions. For example, the remote system(s) 302 may rotate the encryption data at the elapse of a time period (e.g., every day, every week, every month, etc.). To rotate the second encryption data, the remote system(s) may once again obtain the first data representing the captions by decrypting the third encryption data using the first encryption data in order to generate the second encryption data, and then decrypting the second data using the second encryption data. The remote system(s) 302 may then perform 1208-1218 of the example process 1200 using new encryption data that is associated with the captions.

To rotate the first encryption data, the remote system(s) may once again obtain the second encryption data by decrypting the third encryption data using the first encryption data. The remote system(s) 302 may then obtain new encryption data and perform 1210-1218 of the example process 1200.

Figure 13:
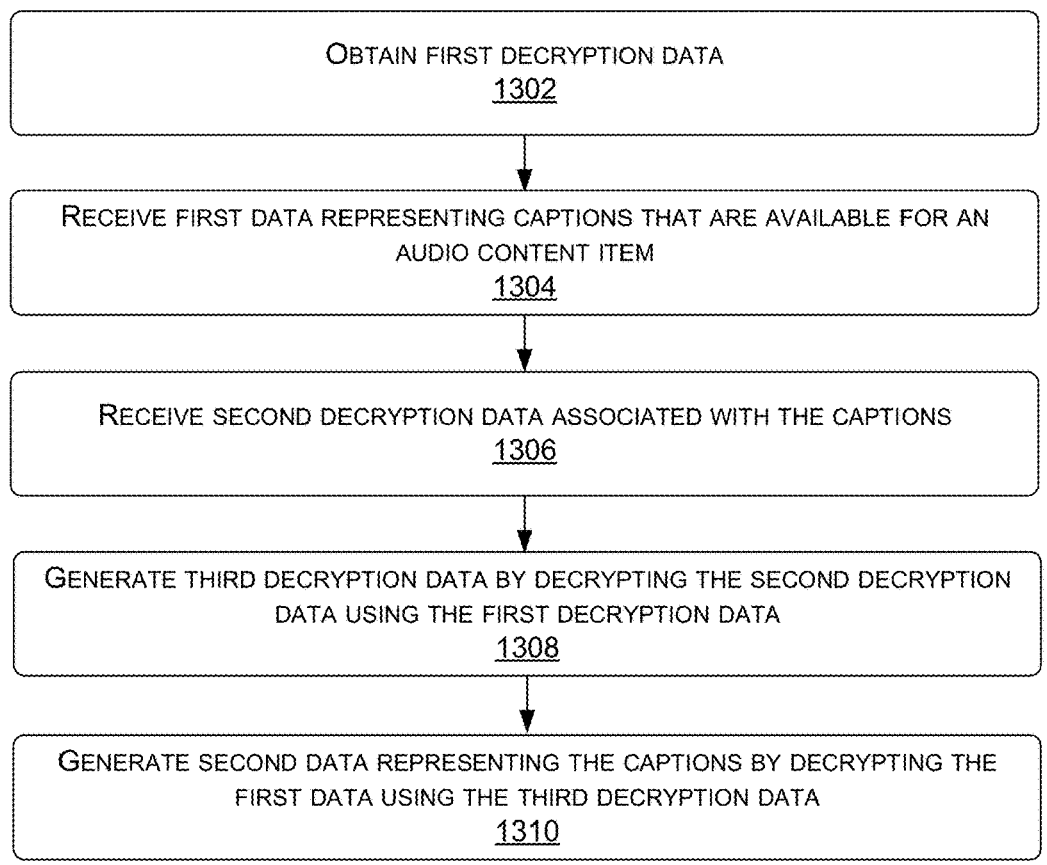
FIG. 13 illustrates an example process for decrypting data that represents captions, according to various examples of the present disclosure.

FIG. 13 illustrates an example process 1300 for decrypting data that represents captions, according to various examples of the present disclosure. At 1302, the process 1300 may include obtaining first decryption data. For instance, the electronic device 102 may obtain the first decryption data. In some instances, the electronic device 1300 receives the first decryption data from the remote system(s) 302, where the electronic device 102 uses the first decryption data to securely communicate with the remote system(s) 302. In some instances, the electronic device 102 stores the first decryption data.

At 1304, the process 1300 may include receiving first data representing captions that are available for an audio content item. For instance, the electronic device 102 may receive, from the remote system(s) 302, the first data representing the captions. The first data may be encrypted for security reasons. In some instances, the electronic device 102 may further receive, from the remote system(s) 302, data representing the audio content item.

At 1306, the process 1300 may include receiving second decryption data associated with the captions. For instance, the electronic device 102 may receive, from the remote system(s) 302, the second decryption data. The second decryption data may be encrypted for security reasons.

At 1308, the process 1300 may include generating third decryption data by decrypting the second decryption data using the first decryption data. For instance, the electronic device 102 may generate the third decryption data by decrypting the second decryption data using the first decryption data.

At 1310, the process 1300 may include generating second data representing the captions by decrypting the first data using the third decryption data. For instance, the electronic device 102 may generate the second data representing the captions by decrypting the first data using the third decryption data. Once generated, the electronic device 102 is then able to output the audio content item.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
a network component;
at least one loudspeaker;
a display;
one or more processors; and
one or more computer-readable media storing instructions that, when executed by the one or more processors, cause the one or more processors to perform operations comprising:
receiving input data representing a selection of an audiobook;
sending, using the network component and to one or more computing devices, selection data representing the selection of the audiobook;
receiving, using the network component and from the one or more computing devices, audio data representing the audiobook;
receiving, using the network component and from the one or more computing devices, caption data representing captions for the audiobook and timestamps for the captions;
identifying, using at least a first timestamp and a second timestamp from the timestamps, a first time period corresponding to a first pause within the audiobook;
determining that the first time period satisfies a threshold time;
in response to determining that the first time period satisfies the threshold time, selecting a first portion of the captions for display, the first portion of the captions beginning with a first word and ending with a second word associated with the first timestamp;
displaying, using the display, the first portion of the captions;
outputting, using the at least one speaker, first sound representing a first portion of the audiobook, the first portion of the audiobook being associated with the first portion of the captions;
while outputting the first sound, identifying, using at least a third timestamp and a fourth timestamp from the timestamps, a second time period corresponding to a second pause within the audiobook;
determining that the second time period satisfies the threshold time;
in response to determining that the second time period satisfies the threshold time, selecting a second portion of the captions for display, the second portion of the captions beginning with a third word associated with the second timestamp and ending with a fourth word associated with the third timestamp; and
after outputting the first sound:
displaying, using the display, the second portion of the captions; and
outputting, using the at least one speaker, second sound representing a second portion of the audiobook, the second portion of the audiobook being associated with the second portion of the captions.

2. The electronic device as recited in claim 1, the operations further comprising:
determining, using the second timestamp, that the second sound represents the third word; and
displaying, using the display and at the second time period, a first graphical element associated with the third word.

3. The electronic device as recited in claim 1, the operations further comprising:
receiving additional input data representing a second selection of a service;
sending, using the network interface and to the one or more computing devices, additional selection data representing a request to join the service;
receiving, using the network interface and from the one or more computing devices, first message data indicating that the captions are available for the audiobook; and
receiving, using the network interface and from the one or more computing devices, second message data indicating that additional captions are not available for an additional audiobook.

4. A method comprising:
receiving audio content;
receiving captions for the audio content;
receiving timestamp data associated with the captions;
identifying, based at least in part on the timestamp data, a first time period between a first word in the captions and a second word in the captions;
determining that the first time period satisfies a threshold time;
in response to determining that the first time period satisfies the threshold time, identifying a first portion of the captions comprising the first word based at least in part on the first time period;
displaying the first portion of the captions;
outputting a first portion of the audio content that is associated with the first portion of the captions;
while outputting the first portion of the audio content, identifying, based at least in part on the timestamp data, a second time period between a third word in the captions and a fourth word in the captions that satisfies the threshold time;
in response to determining that the second time period satisfies the threshold time, identifying a second portion of the captions comprising the second word based at least in part on the second time period; and
after outputting the first portion of the audio content, causing display of the second portion of the captions and outputting a second portion of the audio content that is associated with the second portion of the captions.

5. The method as recited in claim 4, further comprising:
identifying, using the timestamp data, a first timestamp associated with the first word; and
identifying, using the timestamp data, a second timestamp associated with the second word, the second word including a next word after the first word,
wherein identifying the first time period comprises identifying the first time period between the first word and the second word using the first timestamp and the second timestamp.

6. The method as recited in claim 4,
wherein identifying the second portion of the captions comprises identifying the second portion of the captions such that the second portion of the captions starts at the second word and ends at the third word.

7. The method as recited in claim 4, further comprising:
determining at least one of a size of a display or an orientation of the display; and
determining, using the at least one of the size or the orientation, a maximum number of characters for displaying the first portion of the captions at a single instance,
wherein identifying the first portion of the captions is further based at least in part on the maximum number of characters.

8. The method as recited in claim 4, further comprising:
receiving an input indicating a selection of a first additional portion of the audio content;
identifying a second additional portion of the captions associated with the additional portion of the audio content;
displaying the second additional portion of the captions; and
while displaying the second additional portion of the captions, outputting the first additional portion of the audio content.

9. The method as recited in claim 8, wherein the input represents a second selection of a graphical element associated with the first additional portion of the audio content.

10. The method as recited in claim 4, further comprising:
during the first time period, ceasing from displaying the first portion of the captions,
wherein displaying the second portion of the captions also occurs during the first time period.

11. The method as recited in claim 4, further comprising:
determining, at a first time, that the audio content being output is associated with the first word;
displaying, at the first time, a first graphical element indicating that the audio content is associated with the first word;
determining, at a second time, that the audio content being output is associated with the second word; and
displaying, at the second time, a second graphical element indicating that that the audio content is associated with the second word.

12. The method as recited in claim 4, further comprising:
receiving an input indicating a rate for outputting the audio content,
wherein outputting the first portion of the audio content is based at least in part on the rate.

13. The method as recited in claim 4, further comprising:
receiving an input representing a selection of the first word; and
displaying content that is related to the first word.

14. The method as recited in claim 4, further comprising:
receiving first data representing an address for retrieving the captions;
sending, using the address, second data representing a request for the captions, wherein receiving the captions is based at least in part on sending the second data;
receiving third data representing a key associated with the captions; and
decrypting the captions using the key.

15. The method as recited in claim 4, further comprising:
receiving an input associated with outputting an additional portion of the audio content, the additional portion of the audio content starting at a time;
based at least in part on the input, determining that a timestamp represented by the timestamp data is associated with the time;
identifying, using the timestamp, an additional portion of the captions;
displaying the additional portion of the captions; and
while displaying the additional portion of the captions, outputting the additional portion of the audio content.

16. The method as recited in claim 4, further comprising:
receiving first data representing a list of audio content items;
displaying the list of audio content items, the list of audio content items including at least the audio content;
receiving an input indicating a selection of the audio content; and
sending second data representing the selection of the audio content.

17. The method as recited in claim 4, further comprising:
receiving first data representing a list of audio content items;
displaying the list of audio content items, the list of audio content items including at least the audio content and additional audio content;
displaying a first graphical element indicating that the captions are available for the audio content; and
displaying a second graphical element indicating that captions are not available for the additional audio content.

18. An electronic device comprising:
a network component;
at least one audio output device;
a display;
one or more processors; and
one or more computer-readable media storing instructions that, when executed by the one or more processors, cause the one or more processors to perform operations comprising:
receiving, using the network component, audio content;
receiving, using the network component, captions for the audio content;
receiving, using the network component, timestamp data associated with the captions;
identifying, based at least in part on the timestamp data, a first pause between a first word and a second word within the audio content;
determining that the first pause satisfies a threshold amount of time;
in response to determining that the first pause satisfies the threshold amount of time, identifying, using at least the first pause, a first portion of the captions comprising the first word;
displaying, using the display, the first portion of the captions;
outputting, using the at least one audio output device, a first portion of the audio content associated with the first portion of the captions;
while outputting the first portion of the audio content, identifying, based at least in part on the timestamp data, a second pause between a third word and a fourth word within the audio content that satisfies the threshold amount of time;
in response to determining that the second pause satisfies the threshold amount of time, identifying, using at least the second pause, a second portion of the captions comprising the second word; and
after outputting the first portion of the audio content, displaying the second portion of the captions and outputting a second portion of the audio content that is associated with the second portion of the captions.

19. The electronic device as recited in claim 18, wherein identifying the first pause comprises:

identifying, using the timestamp data, a first timestamp associated with the first word included in the captions; and identifying, using the timestamp data, a second timestamp associated with the second word included in the captions, the second word including a next word after the first word; and determining a time period of the pause based at least in part on the first timestamp and the second timestamp.

20. The electronic device as recited in claim 19, wherein identifying the second portion of the captions comprises identifying the second portion of the captions that begins at the second timestamp.

\* \* \* \* \*